(12) United States Patent
Anderson et al.

(10) Patent No.: US 9,870,641 B2
(45) Date of Patent: Jan. 16, 2018

(54) USING AN MM-PRINCIPLE TO ACHIEVE FAST IMAGE DATA ESTIMATION FROM LARGE IMAGE DATA SETS

(71) Applicant: Howard University, Washington, SC (US)

(72) Inventors: John M. M. Anderson, Washington, DC (US); Mandoye Ndoye, Silver Spring, MD (US)

(73) Assignee: Howard University, Washington, DC (US)

( * ) Notice: Subject to any disclaimer, the term of this patent is extended or adjusted under 35 U.S.C. 154(b) by 64 days.

(21) Appl. No.: 14/184,446

(22) Filed: Feb. 19, 2014

(65) Prior Publication Data

US 2015/0279082 A1   Oct. 1, 2015

Related U.S. Application Data

(60) Provisional application No. 61/940,354, filed on Feb. 14, 2014, provisional application No. 61/923,410, (Continued)

(51) Int. Cl.
*G06T 15/00* (2011.01)
*G06T 15/08* (2011.01)
(Continued)

(52) U.S. Cl.
CPC .............. *G06T 15/08* (2013.01); *G01S 7/046* (2013.01); *G01S 7/295* (2013.01); *G01S 13/003* (2013.01); *G01S 13/885* (2013.01); *G01S 13/90* (2013.01)

(58) Field of Classification Search
CPC ........ G01S 7/295; G01S 13/003; G01S 13/90; G01S 7/046; G01S 13/885; G06T 15/08
(Continued)

(56) References Cited

U.S. PATENT DOCUMENTS

| 5,070,877 A | 12/1991 | Mohiuddin et al. |
| 5,135,000 A | 8/1992 | Akselrod et al. |

(Continued)

FOREIGN PATENT DOCUMENTS

| WO | 2012135526 | 10/2012 |
| WO | 2014130566 | 8/2014 |

OTHER PUBLICATIONS

Gogineni, Sandeep, and Arye Nehorai. "Target estimation using sparse modeling for distributed MIMO radar." IEEE Transactions on Signal Processing 59.11 (2011): 5315-5325.*

(Continued)

*Primary Examiner* — Phu K Nguyen
(74) *Attorney, Agent, or Firm* — Fitch Even Tabin & Flannery LLP

(57) ABSTRACT

A majorize-minimize (MM) mathematical principle is applied to least squares regularization estimation problems to effect efficient processing of image data sets to provide good quality images. In a ground penetrating radar application, these approaches can reduce processing time and memory use by accounting for a symmetric nature of a given radar pulse, accounting for similar discrete time delays between transmission of a given radar pulse and reception of reflections from the given radar pulse, and accounting for a short duration of the given radar pulse.

35 Claims, 16 Drawing Sheets

Related U.S. Application Data filed on Jan. 3, 2014, provisional application No. 61/766,569, filed on Feb. 19, 2013.

(51) Int. Cl.

| | | |
|---|---|---|
| G01S 7/295 | (2006.01) | |
| G01S 13/00 | (2006.01) | |
| G01S 13/88 | (2006.01) | |
| G01S 13/90 | (2006.01) | |
| G01S 7/04 | (2006.01) | |

(58) Field of Classification Search
USPC .................................................. 345/419, 424
See application file for complete search history.

(56) References Cited

U.S. PATENT DOCUMENTS

| | | | |
|---|---|---|---|
| 5,732,707 A | 3/1998 | Widder et al. | |
| 7,127,095 B2 | 10/2006 | El Fakhri et al. | |
| 7,251,306 B2* | 7/2007 | Sauer ................... | A61B 6/032 378/207 |
| 7,295,154 B2* | 11/2007 | Walton .................. | G01S 7/352 342/126 |
| 7,519,211 B2 | 4/2009 | El Fakhri et al. | |
| 7,804,440 B1 | 9/2010 | Orr | |
| 8,207,886 B2* | 6/2012 | Chambers ............... | G01S 7/411 342/118 |
| 8,570,208 B2* | 10/2013 | Sarkis ................. | A61B 5/0507 342/179 |
| 2006/0022866 A1 | 2/2006 | Walton et al. | |
| 2006/0104410 A1 | 5/2006 | Sauer et al. | |
| 2006/0187305 A1 | 8/2006 | Trivedi | |
| 2008/0230703 A1 | 9/2008 | Kadrrnas et al. | |
| 2009/0226064 A1 | 9/2009 | El Fakhri et al. | |
| 2010/0060509 A1 | 3/2010 | Chambers et al. | |
| 2010/0312118 A1 | 12/2010 | Horzewski | |
| 2011/0128816 A1 | 6/2011 | Baba et al. | |
| 2011/0150309 A1 | 6/2011 | Barfett | |
| 2012/0019406 A1 | 1/2012 | Sarkis | |
| 2013/0004044 A1 | 1/2013 | Ross | |
| 2014/0016850 A1 | 1/2014 | Anderson | |
| 2014/0236004 A1 | 8/2014 | Rognin | |

OTHER PUBLICATIONS

Notification of Transmittal of the International Search Report and the Written Opinion of the International Searching Authority, or the Declaration from the International Bureau of WIPO for International Application No. PCT/US14/42562 dated Mar. 18, 2015; 10 pages.

Ndoyle, M., et al.; "An MM-based Algorithm for L1-Regularized Least Squares Estimation in GPR Image Reonstruction"; IEEE Radar Conference; pp. 1-6; May 2013.

Notification of Transmittal of the International Search Report and the Written Opinion of the International Searching Authority, or the Declaration from the International Bureau of WIPO for International Application No. PCT/US2014/059062 dated Jan. 14, 2015; 11 pages.

Candes, E., et al.; "Enhancing Sparsity by Reweighted l1 Minimization"; Research paper; Oct. 2007; 28 pages.

Chen, S., et al.; "Atomic Decomposition by Basis Pursuit"; SIAM Journal on Scientific Computing; vol. 43, No, 1, pp. 129-159; 2001.

Davis, G., et al.; "Adaptive Greedy Approximations"; Constructive Approximation; vol. 13, No. 1; 1997; 47 pages.

De Leeuw, J., et al.; "Sharp Quadratic Majorization in One Dimension"; Computational Statistics and Data Analysis; vol. 53, No. 1; 2009; 14 pages.

De Pierro, A.; "A Modified Expectation Maximization Algorithm for Penalized Likelihood Estimation in Emission Tomography"; IEEE Transactions on Medical Imaging; vol. 14, No. 1, pp. 132-137; Mar. 1995.

European Patent Office Extended European Search Report dated Jul. 17, 2014 for European Application No. 12764542.2; 7 pages.

Figueiredo, M., et al.; "Wavelet-Based Image Estimation: An Empirical Bayes Approach Using Jeffrey's Noninformative Prior"; IEEE, Transactions on Image Processing; vol. 10, No. 9, pp. 1322-1331; Sep. 2001.

Hove, J., et al.; "Dual Spillover Problem in the Myocardial Septum with Nitrogen-13-Ammonia Flow Quantitation"; The Journal of Nuclear Medicine; vol. 39, pp. 591-598; Apr. 1998.

Hunter, D., et al.; "A Tutorial on MM Algorithms"; The American Statistician; vol. 58, pp. 30-37; Feb. 2004.

Hutchins, G., et al.; "Noninvasive Quantification of Regional Blood Flow in the Human Heart Using N-13 Ammonia and Dynamic Positron Emission Tomographic imaging"; JACC; vol. 15, No. 5, pp. 1032-1042; Apr. 1990.

Klein, R., et al.; "Kinetic model-based factor analysis of dynamic sequences for 82-rubidium cardiac positron emission tomograph"; Medical Physics; vol. 37, No. 8, pp. 3995-4010; Aug. 2010.

Metje, N., et al.; "Mapping the Underworld—State-of-the-art review" Tunnelling and Underground Space Technology; vol. 22, pp. 568-586; 2007.

Nguyen, L., et al,; "Mine Field Detection Algorithm Utilizing Data From An Ultra Wide-Area Surveillance Radar"; Proc. SPIE 3392, Detection and Remediation Technologies for Mines and Minelike Targets III; vol. 3392, pp. 627-643; Apr. 1998.

Nguyen, L., et al.; "Supperssion of Sidelobes and Noise in Airborner SAR Imagery Using the Recursive Sidelobe Minimization Technique"; U.S. Army Research Laboratory; IEEE Radar Conference; pp. 522-525; May 2010.

Nguyen, L., et al.; "Obstacle Avoidance and Concealed Target Detection Using the Army Research Lab Ultra-Wideband Synchronous Impulse Reconstruction (UWB SIRE) Forward Imaging Radar"; U.S. Army Research Laboratory; Proc of SPIE vol. 6553; 2007; 8 pages.

Nguyen, L., et al.; "Signal Processing Techniques for Forward Imaging Using Ultra-Wideband Synthetic Aperture Radar"; U.S. Army Research Laboratory; Proc of SPIE vol. 5083, pp. 505-518; 2003.

Nguyen, L.; "Image Resolution Computation for Ultra-Wideband (UWB) Synchronous Impulse Reconstruction (SIRE) Radar"; Army Research Laboratory; Sep. 2007; 26 pages.

Nguyen, L.; "Signal and Image Processing Algorithms for U.S. Army Research Laboratory Ultra-wideband (UWB) Synchronous Impulse Re-construction (SIRE) Radar"; Army Research Lab; pp. 35-38; Apr. 2009.

Nguyen, L.; "SAR Imaging Techniques for Reduction of Sidelobes and Noise"; Army Research Laboratory; Proc of SPIE vol. 7308; 2009; 12 pages.

Notification Concerning Transmittal of International Preliminary Report on Patentability from the International Bureau of WIPO for International Application No. PCT/US2012/031263 dated Oct. 10. 2013, 5 pages.

Notification of Transmittal of the International Search Report and the Written Opinion of the International Searching Authority, or the Declaration from the International Bureau of WIPO for International Application No. PCT/US2012/031263 dated Oct. 30, 2012; 8 pages.

Notification of Transmittal of the International Search Report and the Written Opinion of the International Searching Authority, or the Declaration from the International Bureau of WIPO for International Application No. PCT/US2014/017185 dated Jun. 10, 2014; 17 pages.

Potter, L., et al.; "Sparsity and Compressed Sensing in Radar Imaging"; Proceedings of the IEEE; vol. 98, No. 6, pp. 1006-1020; Jun. 2010.

Ressler, M., et al.; "The Army Research Laboratory (ARL) Synchronous Impulse Reconstruction (SIRE) Forward-Looking Radar"; Proc. of SPIE vol. 6561; 2007; 12 pages.

Schmidt, M.; "Least Squares Optimization with L1-NORM Regularization"; Project Report; Dec. 2005; 12 pages.

Tan, X., et al.; "Sparse Learning via Iterative Minimization With Application to MIMO Radar Imaging" ; IEEE Transactions on Signal Processing; vol. 59, No. 3, pp. 1088-1101; Feb. 2011.

(56) References Cited

OTHER PUBLICATIONS

Tibshirani, R.; "Regression Shrinkage and Selection via the Lasso"; Journal of Royal Statistical Society; Series B, vol. 58, No. 1, pp. 267-288; 1996.
Vaida, F.; "Parameter Convergence for EM and MM Algorithms"; Statistica Sinica; vol. 15, No. 3, pp. 831-840; 2005.
Van Der Merwe, A., et al.; "A Clutter Reduction Technique for GPR Data from Mine Like Targets"; Proc. SPIE vol. 3719; Aug. 1999; 12 pages.
Wu, C.; "On the Convergence Properties of the EM Algorithm"; The Annals of Statistics; vol. 11, No. 1, pp. 95-103; Mar. 1983.
Wu, T.T., et al.; "The MM Alternative to EM"; Statistical Science; vol. 25, No. 4, pp. 492-505; Apr. 2011.
Wu, Z., et al.; "An Image Reconstruction Method Using GPR Data"; IEEE Transactions on Geoscience and Remote Sensing; vol. 37, No. 1; Jan. 1999; 8 pages.
Yang, A., et al.; "Fast L1-Minimization Algorithms and an Application in Robust Face Recognition: A Review"; Technical Report No. UCB/EECS-2010-13; Feb. 2010; 14 pages.
Yang, A., et al.; "Fast l1-Minimization Algorithms for Robust Face Recognition"; IEEE Transactions on Image Processing; vol. 22, No. 8, pp. 3234-3246; Jun. 2013.

* cited by examiner

M-M L1-LS ALGORITHM

DAS ALGORITHM

RSM ALGORITHM

MM Based L1-LAD Algorithm

DAS Algorithm

USING AN MM-PRINCIPLE TO ACHIEVE FAST IMAGE DATA ESTIMATION FROM LARGE IMAGE DATA SETS

RELATED APPLICATIONS

This application claims the benefit of U.S. Provisional application No. 61/766,569, filed Feb. 19, 2013, U.S. Provisional application No. 61/923,410, filed Jan. 3, 2014, and U.S. Provisional application No. 61/940,354, filed Feb. 14, 2014, each of which is incorporated by reference in its entirety herein.

GOVERNMENT LICENSE RIGHTS

This invention was made with government support under contract number W911NF-1120039 awarded by US Army Research Laboratory and the Army Research Office. The government has certain rights in the invention.

FIELD OF THE INVENTION

This invention relates generally to image data processing and more specifically to applying the majorize-minimize mathematical principle to achieve fast image data estimation for large image data sets.

BACKGROUND

Half of the coalition forces casualties in the Iraq and Afghanistan wars are attributed to land mines and improvised explosive devices (IEDs). Consequently, a critical goal of the US Army is to develop robust and effective land-mines/IED detection systems that are deployable in combat environments. Accordingly, there is a desire to create robust algorithms for sub-surface imaging using ground penetrating radar (GPR) data and thus facilitate higher IED detection rates and lower false alarm probabilities.

Referring to the example schematic of FIG. 1, a GPR imaging system transmits signals from an above ground transmitter 102 into the ground of a scene-of-interest (SOI) 104. Signals that are reflected off of objects 106, 108, and 110 in the SOI 104 are received by one or more receivers 112 to generate images that convey relevant information about the objects 106, 108, and 110 (also known as scatters) within the SOI 104. As a transmitted pulse propagates into a SOI 104, reflections occur whenever the pulse encounters changes in the dielectric constant ($\in_r$) of the material through which the pulse propagates. Such a transition occurs, for example, when the radar pulse moving through dirt encounters a metal object such as an IED. The strength of a reflection due to a patch of terrain can be quantified by its reflection coefficient, which is proportional to the overall change in dielectric constant within the patch.

In principle, GPR imaging is well-suited for detecting IEDs and land mines because these targets are expected to have much larger dielectric constants than their surrounding material, such as soil and rocks. It should be noted that for a high frequency transmission pulse (i.e., greater than 3 MHz), the backscattered signal of a target can be well approximated as the sum of the backscattered signals of individual elementary scatterers.

The phrase GPR image reconstruction refers to the process of sub-dividing a SOI into a grid of voxels (i.e., volume elements) and estimating the reflection coefficients of the voxels from radar-return data. Existing image formation techniques for GPR datasets include the delay-and-sum (DAS) or backprojection algorithm and the recursive side-lobe minimization (RSM) algorithm.

The DAS algorithm is probably the most commonly used image formation technique in radar applications because its implementation is straightforward. The DAS algorithm simply estimates the reflectance coefficient of a voxel by coherently adding up, across the receiver-aperture, all the backscatter contributions due to that specific voxel. Although the DAS algorithm is a fast and easy-to-implement method, it tends to produce images that suffer from large side-lobes and poor resolution. The identification of targets with relatively small radar cross section (RCS) is thus difficult from DAS images because targets with large a RCS produce large side-lobes that may obscure adjacent targets with a smaller RCS.

The RSM algorithm is an extension of the DAS algorithm that provides better noise and side-lobe reduction, but no improvement in image resolution. Moreover, results from the RSM algorithm are not always consistent. This may be attributed to the algorithm's use of randomly selected apertures or windows through which a measurement is taken. The requirement for a minimum threshold for probability detection and false alarms would make it difficult to use the RSM algorithm in practical applications.

Both the DAS and RSM algorithms fail to take advantage of valuable a-priori or known information about the scene-of-interest in a GPR context, namely sparsity. More specifically, because only a few scatterers are present in a typical scene-of-interest, in other words most of the backscatter data is zero, it is reasonable to expect better estimates of the reflectance coefficients when this a-priori sparsity assumption is incorporated into the image formation process.

Several linear regression techniques for sparse data set applications are known. Algorithms for sparse linear regression can be roughly divided into the following categories: "greedy" search heuristics, iterative re-weighted linear least squares algorithms, and linear inversion and deconvolution via $l_p$-regularized least-squares.

"Greedy" search heuristics such as projection pursuit, orthogonal matching pursuit (OMP), and the iterative deconvolution algorithm known as CLEAN comprise one category of algorithms for sparse linear regression. Although these algorithms have relatively low computational complexity, regularized least-squares methods have been found to perform better than greedy approaches for sparse reconstruction problems in many radar imaging problems. For instance, the known sparsity learning via iterative minimization (SLIM) algorithm incorporates a-priori sparsity information about the scene-of-interest and provides good results. However, its high computational cost and memory-size requirements may make it inapplicable in real-time settings.

Another known approach to sparse linear regression is the iterative re-weighted linear least-squares (IRLS), where the solution of the mathematical $l_1$-minimization problem is given by solving a sequence of re-weighted $l_2$-minimization problems. A conceptually similar approach is to compute the $l_0$-minimization by solving a sequence of re-weighted $l_1$-minimization problems.

Still another known approach to sparse linear regression are the linear inversion and deconvolution via $l_p$-regularized least-squares (LS) methods. In these methods, the reflection coefficients are estimated using $$\hat{x} = \underset{x}{\operatorname{argmin}} \|y - Ax\|_2^2 + \lambda \|x\|_p^p, \tag{1}$$

where $\lambda$ is the regularization parameter. $l_1$-regularization (i.e., p=1) incorporates the sparsity assumptions by approximating the minimum $l_o$ problem, which is to find the most sparse vector that fits the data model. Directly solving the $l_0$-regularization problem is typically not even attempted because it is known to be non-deterministic polynomial-time hard (NP-hard), i.e., very processing intensive to solve. To date, $l_1$-regularization has been the recommended approach for sparse radar image reconstruction.

So called $l_1$-LS algorithms incorporate the sparsity assumption, generally give acceptable results, and could be made reasonably fast via speed-up techniques or parallel/distributed implementations. LS-based estimation can, however, be ineffective and biased in the presence of outliers in the data. This is a particular disadvantage, however, because in practical settings, the presence of outliers in measurements is to be expected.

More specifically, the $l_1$-LS estimation method has been known for some time, wherein the concept has been popularized in the statistics and signal processing communities as the Least Absolute Selection and Shrinkage Operator (LASSO) and Basis Pursuit denoising, respectively. A number of iterative algorithms have been introduced for solving the $l_1$-LS estimation problem. Classical approaches use linear programming or interior-point methods. However, in many real-world and large scale problems, these traditional approaches suffer from high computational cost and lack of estimation accuracy. Heuristic greedy alternatives like Orthogonal Matching Pursuit and Least Angle Regression (LARS) have also been proposed. These algorithms are also likely to fail when applied to real-world, large-scale problems. Several other types of algorithms for providing $l_1$-LS estimates exist in the literature and others continue to be proposed.

SUMMARY

Generally speaking and pursuant to these various embodiments, the mathematical majorize-minimize principle is applied in various ways to process the image data to provide a more reliable image from the backscatter data using a reduced amount of memory and processing resources. In one approach, a processing device processes the initial data set by creating an estimated image value for each voxel in the image by iteratively deriving the estimated image value through application of a majorize-minimize principle to solve an $l_1$-regularized least-squares estimation problem associated with a mathematical model of image data from the initial data set. The application of the majorize-minimize principle to this approach can be further optimized for the GPR context by accounting for a symmetric nature of a given radar pulse, accounting for similar discrete time delays between transmission of a given radar pulse and reception of reflections from the given radar pulse, and accounting for a short duration of the given radar pulse. Application of these assumptions results in a relatively straight forward algorithm that can produce higher quality images while using reduced memory and processing resources.

In a second approach, a processing device processes the initial data set by creating an estimated image value for each voxel in the image by iteratively deriving the estimated image value through application of a majorize-minimize principle to solve the $l_1$-regularized least-absolute deviation (LAD) estimation problem associated with a mathematical model of image data from the initial data set. This so called $l_1$-LAD algorithm is more computationally expensive than some existing algorithms such as the standard DAS and LASSO algorithms; however, this approach can be optimized for the GPR context like the previous approach and provides robust handling of data outliers. Such optimizations result in substantial gains in computational speed and memory-usage are attainable via developed fast implementation techniques. Furthermore, because the estimation of reflectance coefficients is decoupled, parallel and/or distributed implementations can also be developed to increase computational speed.

In a third approach, the majorize-minimize principle is applied to solve an $l_1$-regularized least-squares estimation problem for an image data set output by the popular DAS algorithm. This approach also is computationally efficient and only takes approximately 5% of the time required by the DAS algorithm. In studies using real data, the images created according to this approach are an improvement over the DAS images in that they have reduced clutter and improved sparsity without a loss of known scatterers. Additionally, these images were comparable to images created using the $l_1$-regularized least-squares approach described above even though this third approach only takes 1% of the computational time as the above described $l_1$-regularized least-squares approach.

Accordingly, the above methods use the particularized data collected using transmitters and receivers to output images representing objects in a SOI. Devices, including various computer readable media, incorporating these methods then provide for display of image data using reduced processing and memory resources and at increased speed as processed according to these techniques.

These and other benefits may become clearer upon making a thorough review and study of the following detailed description.

BRIEF DESCRIPTION OF THE DRAWINGS

The above needs are at least partially met through provision of the methods and apparatuses for receiving and processing image data as described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
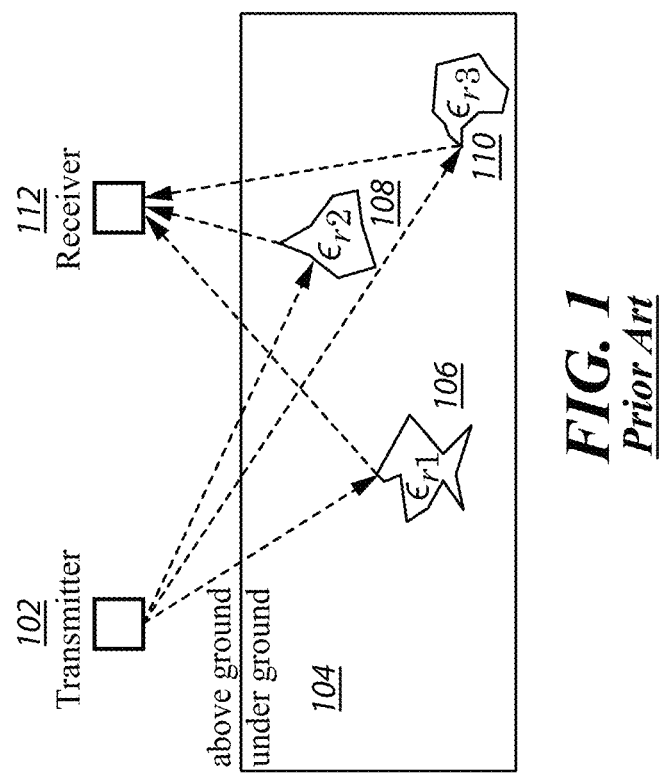
FIG. 1 comprises a schematic of operation a prior art GPR system.
Figure 2:
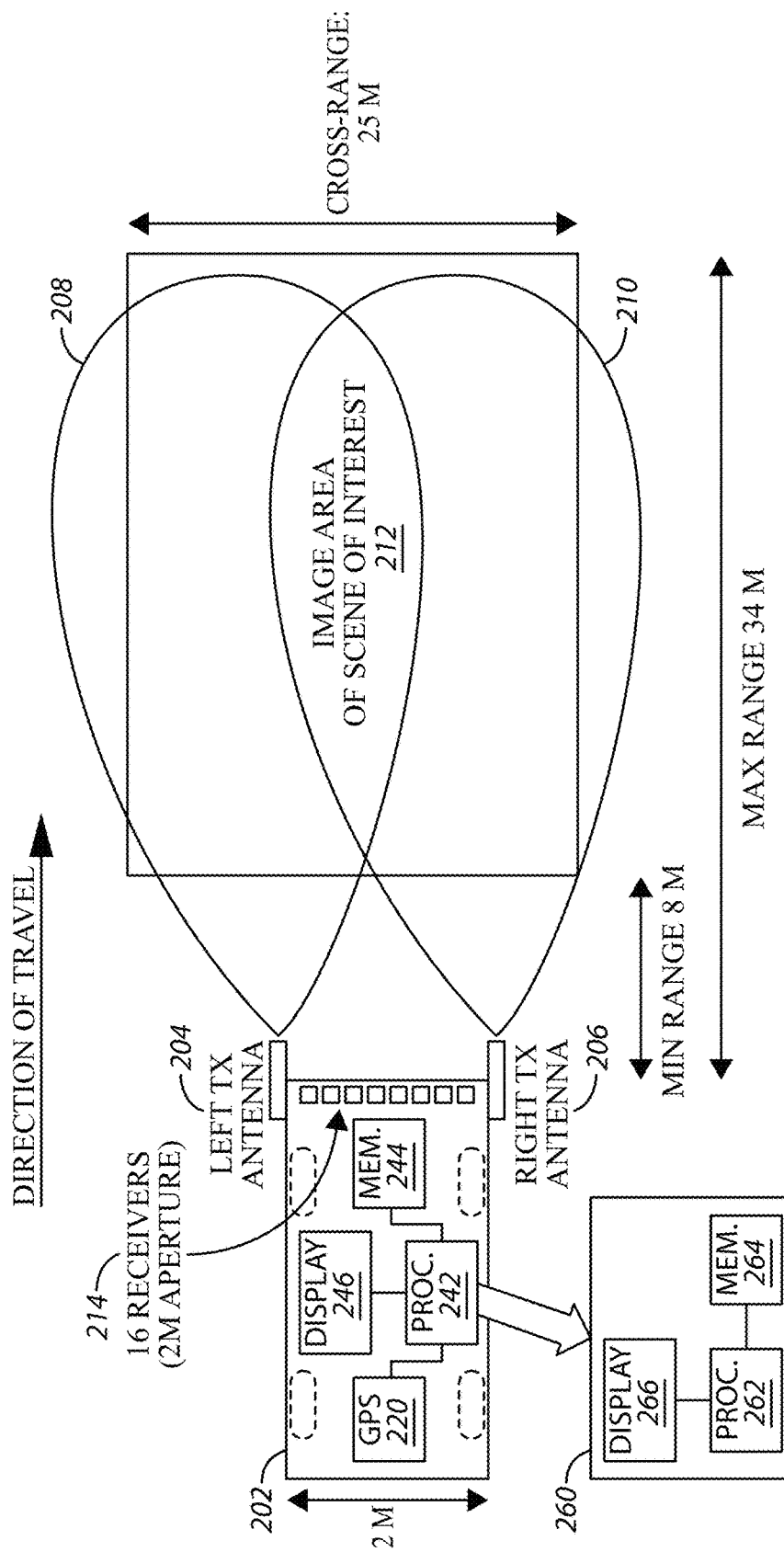
FIG. 2 comprises a schematic of an example radar system as configured in accordance with various embodiments of the invention.

Referring now to the drawings, and in particular to FIG. 2, an illustrative apparatus that is compatible with many of these teachings will now be presented. In a GPR application, a vehicle 202 includes a plurality of radar transmission devices 204 and 206 mounted on the vehicle 202. The radar transmission devices 204 and 206 are configured to transmit radar pulses 208 and 210 into a scene of interest 212. A plurality of J radar reception devices 214 are mounted on the vehicle 202 and configured to detect magnitude of signal reflections from the scene of interest 212 from the radar pulses 208 and 210. The vehicle 202 can be any structure able to carry the radar transmitters and receivers to investigate a scene of interest.

Figure 3:
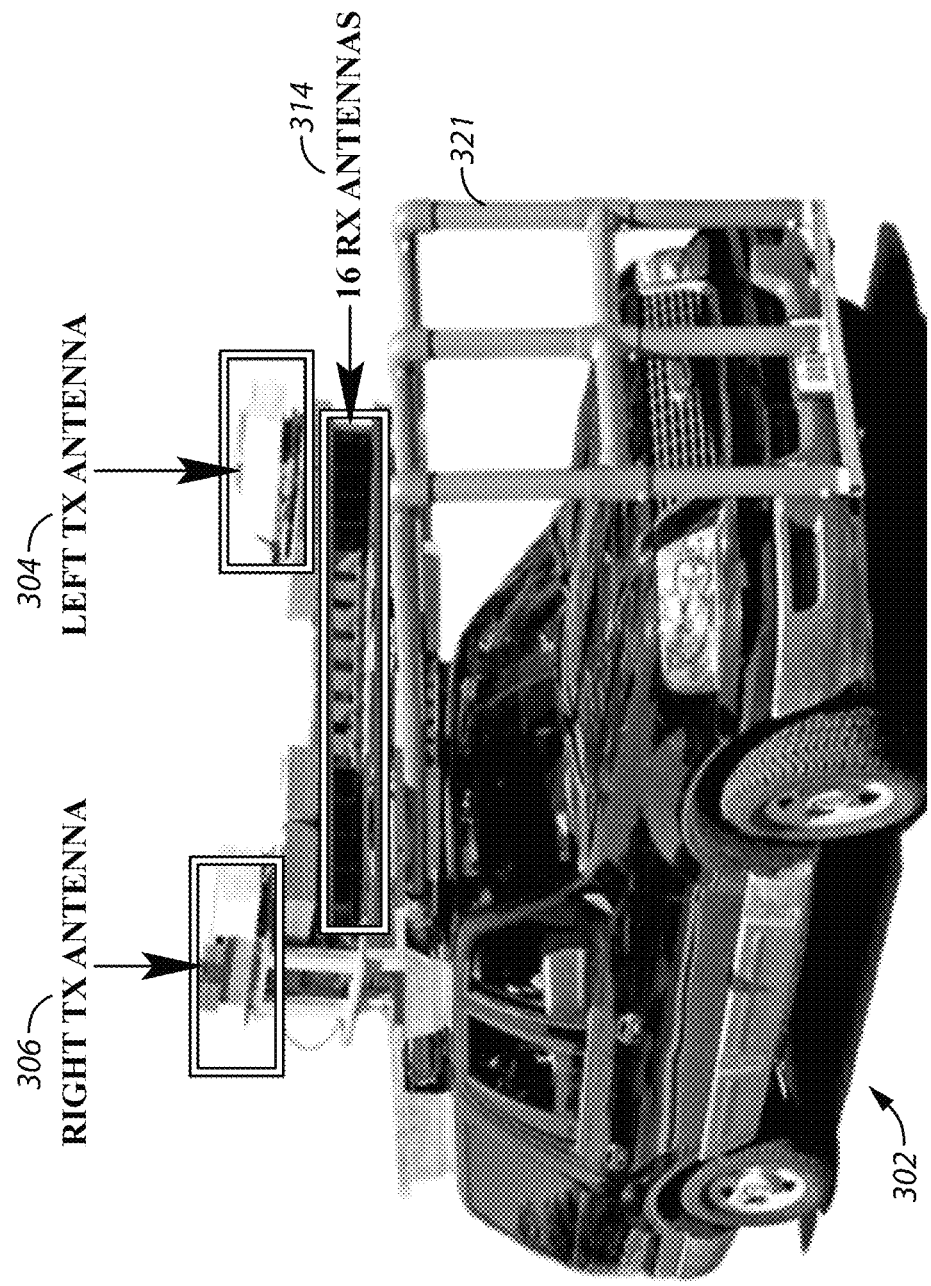
FIG. 3 comprises a perspective view of an example implementation of a prior art ultra wide-band (UWB) synchronous reconstruction (SIRE) radar system.

FIG. 3 illustrates one example implementation: a truck 302 mounted ultra wide-band (UWB) synchronous reconstruction (SIRE) radar system developed by the US Army Research Laboratory (ARL) in Adelphi, Md. This system includes a left transmit antenna 304, a right transmit antenna 306, and 16 receive antennas 314. Other systems may have different numbers of and arrangement of transmit and receive antennas. The transmit and receive antennas are mounted to a support structure 321, which supports these elements on the truck 302. The truck 302 drives through a scene of interest while the transmit antennas 304 and 306 alternately transmit radar pulses and the receiving antennas 314 receive reflections of the transmitted radar pulses from backscatter objects in the scene of interest.

Referring again to the example of FIG. 2, the positions along the vehicle's 202 path at which a radar pulse is transmitted are referred to as the transmit locations, I. As the vehicle 202 moves, the two transmit antennas 204 and 206 alternately send respective probing pulses 208 and 210 toward the SOI 212, and the radar-return profiles reflected from the SOI 212 are captured by multiple receive antennas 214 at each transmit location.

A location determination device 220 detects the location of the vehicle 202 at times of transmission of the radar pulse from the plurality of radar transmission devices 204 and 206 and reception of the signal reflections by the radar reception devices 214. In one example, the location determination device is a global positioning system (GPS) device as commonly known and used, although other position determination devices can be used. Accordingly, the positioning coordinates of the active transmit antenna 204 or 206 and all the receive antennas 214 are also logged. When using the UWB SIRE system of FIG. 3, there is typically a minimum range of detection of objects in the SOI from the vehicle 2020 of about 8 meters, a maximum range of about 34 meters, and a cross-range of about 25 meters. The UWB SIRE system uses a FORD EXPLORER as the vehicle 202 such that the transmit antennas 204 and 206 have about a two meter separation between 16 receivers.

In one approach, the vehicle 202 includes a processing device 242 in communication with the location determining device 220, the transmit antennas 204 and 206, and the receivers 214 to coordinate their various operations and to store information related to their operations in a memory device 244. Optionally, a display 246 is included with the vehicle 202 to display an image related to the data received from the scanning of the scene of interest 212.

Figure 4:
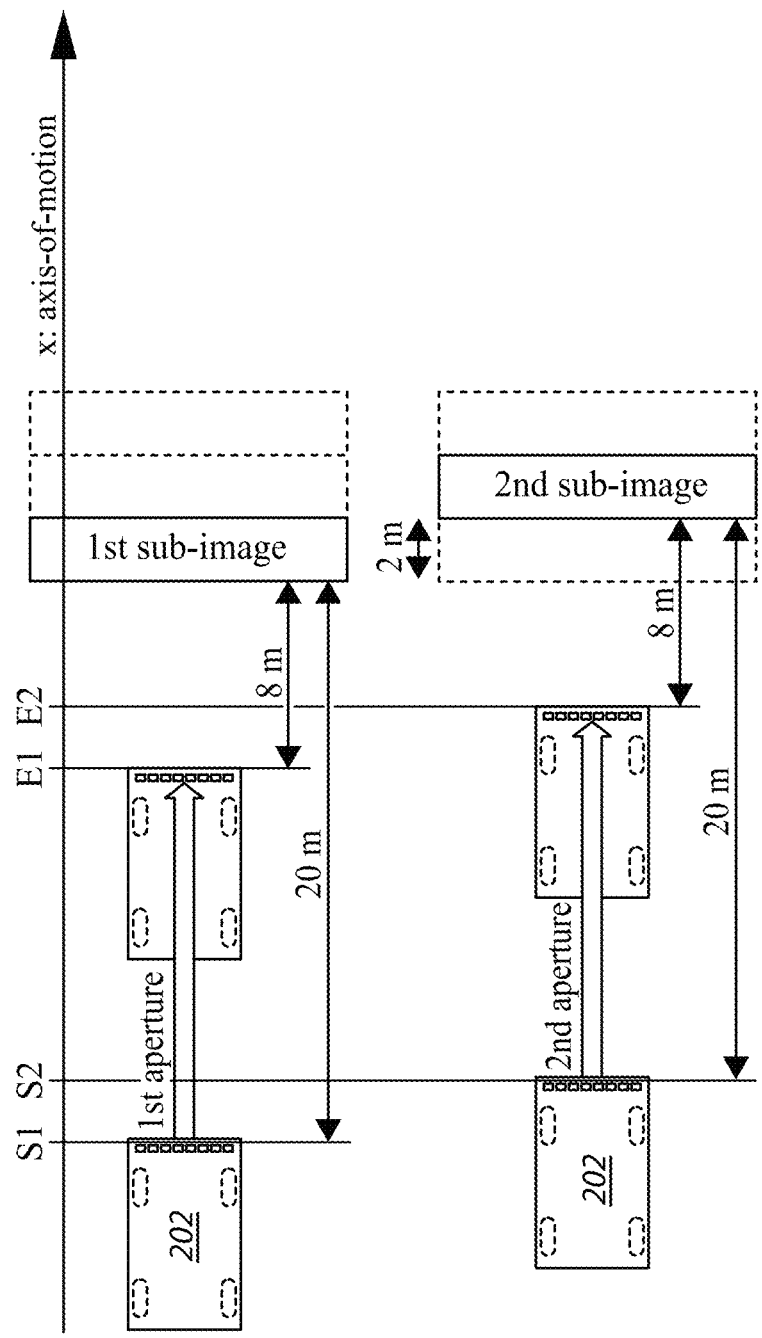
FIG. 4 comprises a schematic demonstrating a prior art approach to obtaining initial data from a SOI.

Due to the large size of the scene-of-interest, an initial data set is not generated by processing all voxels at once. Such an image would have cross-range resolution that varies from the near-range to the far-range voxels. The voxels in the near-range would have much larger resolution than those for the far-range ones. To create GPR images with consistent resolution across the scene-of-interest, we use the mosaicking approach discussed in L. Nguyen, "Signal and Image Processing Algorithms for the U.S. Army Research Laboratory Ultra-wideband (UWB) Synchronous Impulse Reconstruction (SIRE) Radar," ARL Technical Report, ARL-TR-4784, April 2009, which is incorporated by reference and described with reference to FIG. 4. The steps taken to produce a complete image of the scene-of-interest (using the mosaicking approach) are described as follows. The image space associated with the scene-of-interest is divided into 32 sub-images of size 25×2 m². Each sub-image has 250 voxels in the cross-range direction and 100 voxels in the down-range direction. Thus, each sub-image has L=25000 voxels. The aperture (meaning the distance over which the vehicle travels while accumulating data for a SOI) is divided into 32 sub-apertures corresponding to separate, overlapping distances traveled by the vehicle, where adjacent sub-apertures (or vehicle travel windows) overlap by approximately 2 meters. Each sub-aperture has 43 transmit locations and is approximately of size 12×2 m². The radar-return and location positioning measurements associated with a sub-aperture are used to estimate the reflectance coefficients for the corresponding sub-image. The reconstructed sub-images are merged together to obtain the complete image of the scene-of-interest.

In another approach, referring again to FIG. 2, a separate computing device 260 may receive an initial data set from the vehicle based system to further process to create and optionally display images related to the SOI. The computing device 260 will typically include a processing device 262 in communication with a memory 264 to allow for processing the data according to any of the methods described herein. A display 266 may be included with or separate from the computing device 260 and controlled to display images resulting from the processing of the data received from the vehicle 202. Those skilled in the art will recognize and appreciate that such processing devices 242 and 262 can comprise a fixed-purpose hard-wired platform, including, for example, parallel processing devices, or can comprise a partially or wholly programmable platform. All of these architectural options are well known and understood in the art and require no further description here. Moreover, the memory devices 244 and 264 may be separate from or combined with the respective processing devices 242 and 262. Any memory device or arrangement capable of facilitating the processing described herein may be used.

With respect to the collection of data, consider a single scatterer, with spatial position $p_s$, located at the center of a voxel (i.e., volume element) within the SOI. The spatial positions of the active transmit antenna and a receive antenna are denoted by $p_t$ and $p_r$, respectively. If the contributions of measurement noise are momentarily ignored, the relationship between the transmitted signal p(t) and the received signal $g_s(t)$ can be modeled as $$g_s(t) = \alpha_s \cdot p(t - \tau(p_s, p_t, p_r)) \cdot x_s, \quad (2)$$

where $x_s$ is the reflection coefficient of the voxel, $\tau(p_s, p_t, p_r)$ is the time it takes for the pulse to travel from the transmit antenna to the scatterer and back to the receive antenna, and $\alpha_s$ is the attenuation the pulse undergoes along the round-trip path.

The single scatterer model in (2) can be generalized to describe all the measurements captured by the SIRE GPR system. The SOI is subdivided into a rectangular grid of L voxels and the unknown reflection coefficient at the $l^{th}$ voxel is denoted by $x_l$. Extending the model in (2) to the SIRE system, the output of the $j^{th}$ receive antenna at the $i^{th}$ vehicle-stop is given by $$s_{ij}(t) = \sum_{l=1}^{L} \alpha_{ijl} \cdot p(t - \tau_{ijl}) \cdot x_l + w_{ij}(t), \quad (3)$$

$$i = 1, 2, \ldots, I, \ j = 1, 2, \ldots, J.$$

In this equation, $\tau_{ijl}$ is the time it takes for the transmitted pulse to propagate from the active transmit antenna at the $i^{th}$ transmit location to the $l^{th}$ voxel and for the backscattered signal to return to the $j^{th}$ receive antenna. The parameter $\tau_{ijl}$ is given by $$\tau_{ijl} = \frac{d_{il} + d_{ijl}}{c}, \quad (4)$$

where $d_{il}$ denotes the distance from the active transmit antenna at the $i^{th}$ transmit location to the $l^{th}$ voxel, $d_{ijl}$ denotes the return distance from the $l^{th}$ voxel to the $j^{th}$ receive antenna when the truck is at the $i^{th}$ transmit location, and c is the speed of light.

The notation $\alpha_{ijl}$ is the propagation loss that the transmitted pulse undergoes as it travels from the active transmit antenna at the $i^{th}$ transmit location to the $l^{th}$ voxel and back to the $j^{th}$ receive antenna. The parameter $\alpha_{ijl}$ is given by $$\alpha_{ijl} = \frac{1}{d_{il} \cdot d_{ijl}}. \quad (5)$$

The notation $w_{ij}(l)$ represents the noise contribution.

The above mathematical model defined in (3) is continuous whereas, in practice, the SIRE GPR system only stores discrete and separate sampled versions of the return signals. Thus, we introduce the following discrete-time signals to adpat the above model to the real world application: for i=1, 2, ..., I, j=1, 2, ..., J and n=0, 1, ..., N-1, $$y_{ij}[n] \triangleq s_{ij}(nT_s) \quad (6)$$

$$e_{ij}[n] \triangleq w_{ij}(nT_s) \quad (7)$$

where $T_s$ is the sampling interval and N is the number of samples per radar return. From (6) and (7) we can write $$y_{ij}[n] = \sum_{l=1}^{L} \alpha_{ijl} \cdot p(nT_s - \tau_{ijl}) \cdot x_l + e_{ij}[n]. \quad (8)$$

The corresponding system of N equations can be written in matrix form as $$y_{ij} = D_{ij} P_{ij} x + e_{ij} \quad (9)$$

where $$y_{ij} \triangleq \begin{bmatrix} y_{ij}[0] \\ y_{ij}[1] \\ \vdots \\ y_{ij}[N-1] \end{bmatrix}, \ x \triangleq \begin{bmatrix} x_1 \\ x_2 \\ \vdots \\ x_L \end{bmatrix}, \ e_{ij} \triangleq \begin{bmatrix} e_{ij}[0] \\ e_{ij}[1] \\ \vdots \\ e_{ij}[N-1] \end{bmatrix}. \quad (10)$$

The matrix $D_{ij}$ is an L×L diagonal matrix containing the attenuation coefficients that is given by $$D_{ij} \begin{bmatrix} \alpha_{ij1} & 0 & \cdots & 0 \\ 0 & \alpha_{ij2} & \cdots & 0 \\ \vdots & 0 & \ddots & \vdots \\ 0 & \cdots & 0 & \alpha_{ijL} \end{bmatrix}. \quad (11)$$

The matrix $P_{ij}$ is an N×L matrix containing shifted versions of the transmitted pulse that is defined to be $$P_{ij} \triangleq \begin{bmatrix} p(0 \cdot T_s - \tau_{ij1}) & p(0 \cdot T_s - \tau_{ij2}) & \cdots & p(0 \cdot T_s - \tau_{ijL}) \\ p(1 \cdot T_s - \tau_{ij1}) & p(1 \cdot T_s - \tau_{ij2}) & \cdots & p(1 \cdot T_s - \tau_{ijL}) \\ \vdots & \vdots & \ddots & \vdots \\ p((N-1) \cdot T_s - \tau_{ij1}) & p((N-1) \cdot T_s - \tau_{ij2}) & \cdots & p((N-1) \cdot T_s - \tau_{ijL}) \end{bmatrix}. \quad (12)$$

In other words, the sampled data vectors (i.e., values for position and signal for transmission and reception of radar pulses) for all transmitters and receivers pairs $\{y_{ij}\}$ are concatenated to obtain a K×1 (K=IJN) data vector y. Extending the model in (9) to account for all I·J transmitter and receiver pairs yields the desired model $$y = Ax + e, \quad (13)$$

where the K×1 data vector y, K×L system matrix A, and K×1 Gaussian noise vector e are given by $$y \triangleq \begin{bmatrix} y_{11} \\ y_{12} \\ \vdots \\ y_{1J} \\ y_{21} \\ \vdots \\ y_{2J} \\ \vdots \\ y_{I1} \\ \vdots \\ y_{IJ} \end{bmatrix}, A \triangleq \begin{bmatrix} P_{11}D_{11} \\ P_{12}D_{12} \\ \vdots \\ P_{1J}D_{1J} \\ P_{21}D_{21} \\ \vdots \\ P_{2J}D_{2J} \\ \vdots \\ P_{I1}D_{I1} \\ \vdots \\ P_{IJ}D_{IJ} \end{bmatrix}, e \triangleq \begin{bmatrix} e_{11} \\ e_{12} \\ \vdots \\ e_{1J} \\ e_{21} \\ \vdots \\ e_{2J} \\ \vdots \\ e_{I1} \\ \vdots \\ e_{IJ} \end{bmatrix}. \quad (14)$$

Because the SIRE GPR system uses an UWB radar, the duration of the transmitted pulse p(t) is relatively short so that the system matrix A is sparse.

Given the pulse p(t), location (e.g., GPS) data, and observation-vector y, the objective is to estimate the unknown reflection coefficient vector x, which represents the material reflecting radar pulses in the SOI Displaying this reflection coefficient data will correspond to displaying the objects in the SOI.

The Majorize-Minimize Principle

The MM (which stands for majorize-minimize in minimization problems, and minimize-majorize in maximization problems) principle is a prescription for constructing solutions to optimization problems. An MM algorithm minimizes an objective function by successively minimizing, at each iteration, a judiciously chosen objective function that is known as a majorizing function. Whenever a majorizing function is optimized, in principle, a step is taken toward reaching the minimizer of the original objective function. A brief summary of the MM principle is now given with reference to FIG. 5.

Let $f$ be a function to be minimized over some domain $D \in \mathbb{R}^L$, i.e., the function's minimum value is to be found within the given domain. A real value function g with domain D×D is said to majorize $f$ if $$g(x,y) \geq f(x) \text{ for all } x, y \in D \quad (15)$$

$$g(x,x) = f(x) \text{ for all } x \in D. \quad (16)$$

Figure 5:
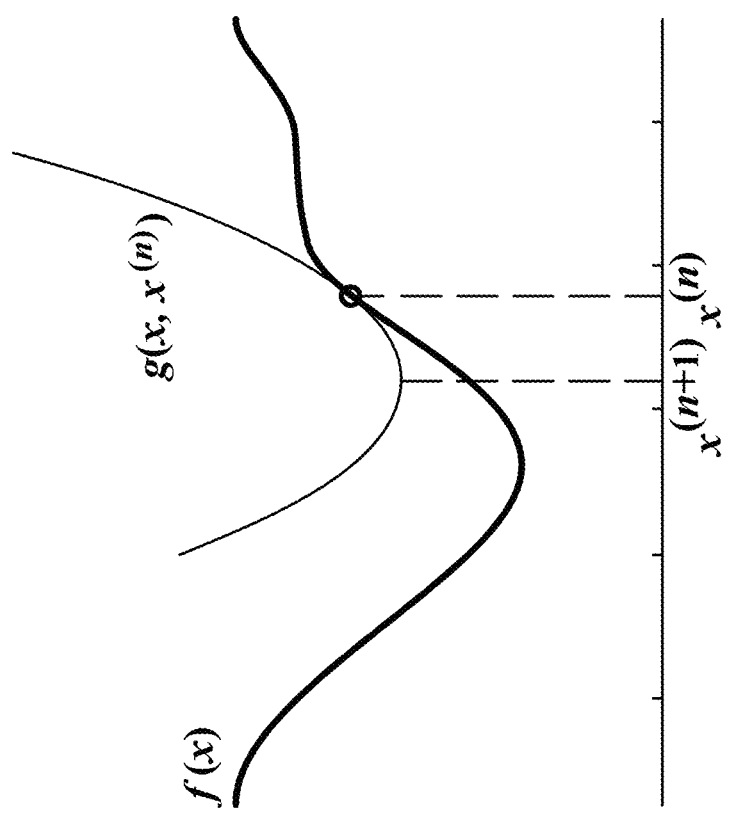
FIG. 5 comprises a graph demonstrating application of the mathematical majorize-minimize principle.

Suppose the majorizing function g is easier to minimize than the original objective function $f$. Then, the MM algorithm for minimizing $f$ is given by $$x^{(m+1)} = \underset{x \in D}{\arg\min}\, g(x, x^{(m)}), \quad (17)$$

where $x^{(m)}$ is the current estimate for the minimizer of $f$. The algorithm defined by (17), which is illustrated in FIG. 5, is guaranteed to monotonically decrease the objective function $f$ with increasing iteration. In other words, a further minimal or smaller value for the function $f$ is obtained with each iteration of the algorithm, stepping between successive functions g. To see this result, first observe that, by definition, $$g(x^{(m+1)}, x^{(m)}) \leq g(x^{(m)}, x^{(m)}). \quad (18)$$

Now from (15) and (16), it follows that $$f(x^{(m+1)}) \leq g(x^{(m+1)}, x^{(m)}) \leq g(x^{(m)}, x^{(m)}) = f(x^{(m)}). \quad (19)$$

In other words and as illustrated in FIG. 5, the function $g(x, x^{(n)})$ intersects with the function $f(x)$ at $x^{(n)}$ and also has a further minimum at point $x^{(n+1)}$. That further minimum point is used in the next iteration as a new $g(x^{(n)})$ from which a new minimum at a new $x^{(n+1)}$ may be determined.

MM-Based Image Reconstruction Using L1-Regularization

Using the above parameters, in a first approach to providing a fast and accurate image by exploiting the known sparsity of the scatterers, the object data represented by the reflection coefficient vector is estimated using the well-established $l_1$-LS estimation method $$\hat{x} = \underset{x}{\arg\min} \|y - Ax\|_2^2 + \lambda \|x\|_1, \quad (20)$$

where λ is the regularization parameter or penalty parameter. In contrast to previous approaches, the optimization problem in (20) is solved using the above described MM framework, which leads to an iterative algorithm that is efficient, straightforward to implement and amenable to parallelization. Additionally, the algorithm is guaranteed to monotonically decrease the objective function in (20) to guarantee coming to a final result through the iteration.

Recall that the objective function to be minimized is of the form $$\varphi(x) = \varphi_1(x) + \lambda \varphi_2(x) \quad (21)$$

where $\varphi_1(x) \triangleq \|y - Ax\|_2^2$ and $\varphi_2(x) \triangleq \|x\|_1$, and the regularization or penalty parameter λ is strictly positive. To find a majorizer for the function $\varphi_1$, we use a result from DePierro (A. R. De Pierro, "A modified expectation maximization algorithm for penalized likelihood estimation in emission tomography," Medical Imaging, IEEE Transactions on, vol. 14, no. 1, pp. 132 to 137, 1995, which is incorporated by reference herein) outlined as follows. First, $\varphi_1(x)$ is expressed as $$\phi_1(x) = \sum_{k=0}^{k-1} y_k^2 - 2\sum_{k=0}^{K-1} y_k [Ax]_k + \sum_{k=0}^{K-1} ([Ax]_k)^2 \quad (22)$$

where $$[Ax]_k \triangleq \sum_{l=1}^{L} A_{kl} x_l \quad (23)$$

is the $k^{th}$ component of the vector Ax. They then exploit the convexity of the square function and construct a majorizing function for $([Ax]_k)^2$. By denoting $r_k$ as the number of nonzero elements in the $k^{th}$ row of A and defining $$c_{kl} \triangleq \begin{cases} r_k^{-1}, & A_{kl} \neq 0 \\ 0, & A_{kl} = 0, \end{cases} \quad (24)$$

they have $$([Ax]_k)^2 = \left( \sum_{l=1}^{L} c_{kl} (r_k A_{kl} x_l - r_k A_{kl} x_l^{(m)} + [Ax^{(m)}]_k) \right)^2 \quad (25)$$

for any vector $x^{(m)}$ in $\mathbb{R}^L$. Because $$\sum_{l=1}^{L} c_{kl} = 1 \quad (26)$$

for all k, it follows from the convexity of the square function that $$([Ax]_k)^2 \leq q(x, x^{(m)}), \quad (27)$$

where $$q(x, x^{(m)}) \triangleq \sum_{l=1}^{L} c_{kl} (r_k A_{kl} x_l - r_k A_{kl} x_l^{(m)} + [Ax^{(m)}]_k)^2. \quad (28)$$

From Equation (27) and the fact that $q(x^{(m)}, x^{(m)}) = ([Ax]_k)^2$, it follows that q is a majorizing function for $([Ax]_k)^2$. Thus replacing $([Ax]_k)^2$ by $q(x, x^{(m)})$ in (22) produces $$Q_1(x, x^{(m)}) = \sum_{k=0}^{K-1} y_k^2 - 2\sum_{k=0}^{K-1} y_k [Ax]_k + \sum_{k=0}^{K-1} q(x, x^{(m)}). \quad (29)$$

the desired majorizing function for $\phi_1$.

A quadratic majorizer for the absolute value function |x| was derived by de Leeuw and Lange (J. de Leeuw and K. Lange, "Sharp quadratic majorization in one dimension," Computational statistics and data analysis, vol. 53, no. 7, pp. 2471 to 2484, 2009, which is incorporated by reference herein) where $$z(x, y) = \sum_{l=1}^{L} \frac{x^2}{2|y|} + \frac{1}{2}|y|. \quad (30)$$

It follows readily from this result that a majorizing function for the function $\phi_2$ is $$Q_2(x, x^{(m)}) = \sum_{l=1}^{L} z(x_l, x_l^{(m)}). \quad (31)$$

Because $\lambda$ is positive, a majorizing function for the $l_1$-LS objective function $\phi$ is $$Q(x, x^{(m)}) = Q_1(x, x^{(m)}) + \lambda Q_2(x, x^{(m)}) \quad (32)$$

From the general expression in provided by G. Davis, S. Mallat, and M. Avellaneda, "Adaptive greedy approximations," Constructive approximation, vol. 13, no. 1, pp. 57 to 98, 199, which is incorporated by reference herein, it follows that the next iterate is given by $$x^{(m+1)} = \underset{x \in \mathbb{R}^L}{\arg \min} Q(x, x^{(m)}). \quad (33)$$

We obtain the desired iterative algorithm by setting to zero the derivative of $Q(x, x^{(m)})$ with respect to the components of x. Straightforward calculations show that the partial derivative of $Q(x, x^{(m)})$ with respect to $x_l$ is given by $$\frac{\partial Q(x, x^{(m)})}{\partial x_l} = \quad (34)$$

$$-2\sum_{k=0}^{K-1} y_k A_{kl} + 2\sum_{k=0}^{K-1} (r_k A_{kl}^2 x_l - r_k A_{kl}^2 x_l^{(m)} + A_{kl}[Ax^{(m)}]_k) + \lambda \frac{x_l}{|x_l^{(m)}|}.$$

Setting the derivatives in (34) to zero leads to the following MM algorithm for the $l_1$-LS estimation problem, representing application of a majorize-minimize principle to solve an $l_1$-regularized least-squares estimation problem associated with a mathematical model of image data from the initial data set:

$$x_l^{(m+1)} = \frac{H_l \cdot x_l^{(m)} + G_l^{(m)}}{H_l + \frac{\lambda}{2|x_l^{(m)}|}} \quad (35)$$

for $l = 1, 2, \ldots, L$ where $$H_l = \sum_{k=0}^{K-1} r_k A_{kl}^2, \quad (36)$$

$$G_l^{(m)} = \sum_{k=0}^{K-1} A_{kl}(y_k - [Ax^{(m)}]_k). \quad (37)$$

In other words, one may iteratively derive an estimated image value for a given voxel using the equation (35). Accordingly, a processing device may be configured to process an initial data set by creating an estimated image value for each voxel in the image by iteratively deriving the estimated image value through application of a majorize-minimize principle to solve an $l_1$-regularized least-squares estimation problem associated with a mathematical model of image data from the initial data set.

One readily observes in (35) that the estimation of individual reflectance coefficients is decoupled because, for a given pixel, the computation of the next estimate $x_1^{(m+1)}$ only depends on the current estimate $x_1^{(m)}$. The proposed algorithm is thus amenable to parallel, distributed, and/or graphics processing unit (GPU) processing, which can further expedite processing of the image data over other processing approaches that cannot be implemented using such processing techniques. Moreover, this approach can be readily applied to a variety of applications where datasets are collected using synthetic aperture imaging measurement principles.

A further benefit of this approach is the stability of the algorithm because of its convergence properties. To illustrate this benefit, certain theoretical results on the convergence of MM algorithms are described below to analyze the convergence properties of the above described MM-based $l_1$-LS algorithm.

First, we re-state here the so called Condition C2 and Theorem 3 of F. Vaida, "Parameter convergence for EM and MM algorithms," Statistica Sinica, vol. 15, no. 3, p. 831, 2005, which is incorporated herein by reference, in the context of the MM algorithms, where they apply with minor modifications. These modifications include: (1) the regularity condition R4, which concern the missing data distribution, is not necessary; and (2) for the regularity condition R5 and the condition C2, the expected log-likelihood function of the augmented data is now replaced by the majorizing function.

For the Condition C2 aspect as discussed in the Vaida reference, let $S$ be the set of stationary points defined as $$S_\phi = \left\{ x^* : \frac{\partial}{\partial x} \phi(x^*) = 0 \right\}, \tag{38}$$

where $\phi$ is the $l_1$-LS cost function. For all $x \in S$, there exists a unique global minimizer of the majorizing function Q.

For the Theorem 3 aspect as discussed in the Vaida reference, consider an MM iteration sequence $\{x^{(m)}\}$ that is defined by the starting point $x^{(0)}$ and iteration $x^{(m+1)} = M(x^{(m)})$. If Condition C2 holds, then for any starting point $x^{(m)} \to x^*$ as $m \to \infty$, for some stationary point $x^*$ in $S$. Moreover, $x^* = M(x^*)$ and, if $x^{(m)} \neq x^*$ for all m, the sequence of cost function values $\phi(x^{(m)})$ is strictly decreasing to $\phi(x^*)$.

Theorem 3 gives a simple condition to test the convergence of MM algorithms; that is, if the global minimum of the majorizing function $Q(\cdot, x^*)$ is unique for all $x^* \in S$, then the sequence the MM iterates $\{x^{(m)}: m=0, 1, \ldots\}$ will converge to a stationary point. We now show that the majorizing function Q for the $l_1$-LS cost function $\phi$ is strictly convex and, thus has a unique global minimizer for all stationary points.

The second-order partial derivatives of the function $Q(\cdot, x^*)$ are given by $$\frac{\partial^2 Q(x, x^*)}{\partial x_l^2} = \begin{cases} 2\sum_{k=0}^{K-1} r_k A_{kl}^2, \dfrac{\lambda}{|x_l^*|}, & l = k \\ 0, & l \neq k. \end{cases} \tag{39}$$

Thus, the Hessian matrix of $Q(\cdot, x^*)$ is diagonal. By the principles disclosed by T. T. Wu and K. Lange, "The MM alternative to EM," Statistical Science, vol. 25, no. 4, pp. 492 to 505, 2010, which is incorporated by reference herein, $x^*_l$ must be non-zero for all l. Therefore, from (39) it follows that $$0 < \frac{\partial^2 Q(x, x^*)}{\partial x_l^2} < \infty, \tag{40}$$

for all $x, x^* \in \Omega,$ which implies that the Hessian matrix of $Q(\cdot, x^*)$ is strictly positive definite. Consequently, $Q(\cdot, x^*)$ is a strictly convex function and thus has a unique global minimum for all $x^* \in S$. Finally, by Theorem 3, the MM-based $l_1$-LS algorithm is guaranteed to converge to a stationary point.

Description of the Fast Implementation

When applied in a typical GPR context, the computation of the term $G_l^{(m)}$ in (35) requires the K×L matrix A where K=IJN. For the above described UWB SIRE radar system, these parameters are I=43 transmit locations, J=16 receive antennas, N=1350 data samples per return-profile, and L=25000 pixels.

These parameter settings require 173 gigabytes (GB) of memory to merely store the system matrix A. Because A has many zero-elements, however, the data could be more efficiently stored as a sparse matrix. Nevertheless, a sparse representation for A would still require approximately 16 GB of memory. With such a large memory size requirement, the construction of the A matrix in the current formulation of the algorithm is not feasible or practical for typical computing platforms, especially in field deployment where on site imaging would be advantageous. Indeed, virtually any other GPR image formation method that requires explicitly constructing the system matrix would have comparable requirements.

In addition to memory size challenges, computational cost would also be an issue for the current format of the MM-based $l_1$-LS algorithm. At each iteration, the computation of $G_l^{(m)}$ would require the matrix multiplication $Ax^{(m)}$, which has $\mathcal{O}(KL)$ time complexity. This operation is thus not practical for large-scale implementations where the parameters K and L are expected to be relatively large. For example, in our case, we have K=27520 and L=25000. Additional costs include the computation of the term $H_l$ where the number of non-zero elements in each of the K rows of A is needed. To arrive at a fast and memory-efficient implementation of the algorithm in (35), the following acceleration techniques may be implemented.

Fast Implementation of $G_l^{(m)}$

In a GPR context, the mathematical expressions at equations (36) and (37) above can be modified to reduce processing time and required memory by accounting for a symmetric nature of a given radar pulse, accounting for similar discrete time delays between transmission of a given radar pulse and reception of reflections from the given radar pulse, and accounting for a short duration of the given radar pulse. Accordingly, the equation for determining estimates for values x representing reflectance coefficients of the objects in the SOI, (35), involves calculation of the terms $G_l^{(m)}$ and $H_l$, which calculation can be streamlined according to the above assumptions. In application, a processing device is configured to calculate terms used to obtain the estimated value. Pursuant to these aspects, the expression for $G_l^{(m)}$ in (37) can be written as $$G_l^{(m)} = \sum_{i=1}^{I} \sum_{j=1}^{J} \sum_{n=0}^{N-1} \alpha_{ijl} \cdot p(nT_s - \tau_{ijl}) \cdot g_{ij}^{(m)}(nT_s) \tag{41}$$

where, for n=0, 1, ..., N−1, $$g_{ij}^{(m)}(nT_s) = y_{ij}[n] - \sum_{l=1}^{L} \alpha_{ijl} \cdot x_l^{(m)} \cdot p(nT_s - \tau_{ijl}). \quad (42)$$

To facilitate a fast implementation, we approximate the quantity $G_l^{(m)}$ by $$\hat{G}_l^{(m)} \triangleq \sum_{i=i}^{I} \sum_{j=1}^{J} \sum_{n=0}^{N-1} \alpha_{ijl} \cdot p(nT_s - n_{ijl}T_s) \cdot \hat{g}_{ij}^{(m)}(nT_s), \quad (43)$$

where $$n_{ijl} \triangleq \text{round}\left(\frac{\tau_{ijl}}{T_s}\right) \quad (44)$$

$$\hat{g}_{ij}^{(m)}(nT_s) \triangleq y_{ij}[n] - \hat{s}_{ij}^{(m)}(nT_s) \quad (45)$$

$$\hat{s}_{ij}^{(m)}(nT_s) \triangleq \sum_{l=1}^{L} \alpha_{ijl} \cdot x_l^{(m)} \cdot p(nT_s - n_{ijl}T_s). \quad (46)$$

We will refer to the set of values $\{n_{ijl}\}$ as the discrete-time delays. We can write $\hat{G}_l^{(m)}$ as $$\hat{G}_l^{(m)} = \sum_{i=i}^{I} \sum_{j=1}^{J} \alpha_{ijl} \cdot \hat{G}_{ijl}^{(m)} \quad (47)$$

where $$\hat{G}_{ijl}^{(m)} = \sum_{n=0}^{N-1} p(nT_s - n_{ijl}T_s) \cdot \hat{g}_{ij}^{(m)}(nT_s) \quad (48)$$

$$= \sum_{n=0}^{N-1} w[n - n_{ijl}] \cdot \hat{g}_{ij}^{(m)}[n] \quad (49)$$

$$= \left\{\sum_{n=0}^{N-1} w[n - k]\hat{g}_{ij}^{(m)}[n]\right\}\bigg|_{k=n_{ijl}} \quad (50)$$

with $w[n] \triangleq p(nT_s)$. Because the transmitted pulse $p(t)$ is symmetric, $w[n-k]=w[k-n]$ holds for all n and k, and thus $$\hat{G}_{ijl}^{(m)} = \left\{\sum_{n=0}^{N-1} w[k - n]\hat{g}_{ij}^{(m)}[n]\right\}\bigg|_{k=n_{ijl}} \quad (51)$$

$$= \{(w * \hat{g}_{ij}^{(m)})[k]\}|_{k=n_{ijl}} \quad (52)$$

$$= \{(w * (y_{ij} - \hat{s}_{ij}^{(m)}))[k]\}|_{k=n_{ijl}}. \quad (53)$$

It is readily observed that computing $\hat{G}_{ijl}^{(m)}$ requires the convolution of the discrete pulse $w[n]$ with the $m^{th}$ iteration of the error-term sequence $(y_{ij}[n] - \hat{s}_{ij}^{(m)}[n])$. The sequences $w[n]$ and $y_{ij}[n]$ are given. Hence, to efficiently compute $\hat{G}_{ijl}^{(m)}$, a computationally efficient way for generating the sequence $\hat{s}_{ij}^{(m)}[n]$ is needed.

First, we note that the collection of discrete-time delays $\{n_{ijl}\}$ is expected to have repeated values. Let $k_{min}$ and $k_{max}$ denote respectively the minimum and maximum discrete-time delays. The sifting property of the unit impulse function can be used to write $$\hat{s}_{ij}^{(m)}[n] = \sum_{k=k_{min}}^{k_{max}} \left\{\sum_{l=1}^{L} \alpha_{ijl} \cdot x_l^{(m)} \cdot w[n - n_{ijl}] \cdot \delta[k - n_{ijl}]\right\} \quad (54)$$

$$= \sum_{k=k_{min}}^{k_{max}} \left\{\sum_{l=1}^{L} \alpha_{ijl} \cdot x_l^{(m)} \cdot w[n - k] \cdot \delta[k - n_{ijl}]\right\} \quad (55)$$

$$= \sum_{k=k_{min}}^{k_{max}} \left\{\sum_{l=1}^{L} \alpha_{ijl} \cdot x_l^{(m)} \cdot \delta[k - n_{ijl}]\right\} w[n - k] \quad (56)$$

$$= \sum_{k=k_{min}}^{k_{max}} q_{ij}[k] \cdot w[n - k] \quad (57)$$

$$= (q_{ij} * w)[n] \quad (58)$$

where $$q_{ij}[k] \triangleq \sum_{l=1}^{L} \alpha_{ijl} \cdot x_l^{(m)} \cdot \delta[k - n_{ijl}]. \quad (59)$$

The term $q_{ij}[k]$ can then be expressed as $$q_{ij}[k] \triangleq \sum_{l \in S_k} d_{ijl}^{(m)} \quad (60)$$

where $d_{ijl}^{(m)} = \alpha_{ijl} \cdot x_l^{(m)}$ and $S_k = \{l=1, 2, \ldots, L: n_{ijl}=k\}$.

In other words, the term $q_{ij}[k]$ is computed by accumulating all elements of $$d_{ij}^{(m)} = [d_{ij1}^{(m)}, d_{ij2}^{(m)}, \ldots, d_{ijL}^{(m)}] \quad (61)$$

for which associated discrete-time delay indexes $n_{ijl}$ have the same integer value k. Consequently, $q_{ij}[k]$ can then be computed in a very efficient manner using the hash table data structure concept. The indexes of a hash table, typically referred to as keys, are the integers between $k_{min}$ and $k_{max}$, and the record associated with the $k^{th}$ key is the set of values $$\{d_{ijl}^{(m)}; l=1,2, \ldots, L; n_{ijl}=k\}. \quad (62)$$

By one approach, the hash-table-based computation of $q_{ij}[k]$ is implemented using a processing device configured to use MATLAB using the accumarray function. The variables d, n and q store the following sequences:

$$d \leftarrow d_{ij}^{(m)} = [d_{ij1}^{(m)}, d_{ij2}^{(m)}, \ldots, d_{ijL}^{(m)}] \quad (63)$$

$$n \leftarrow n_{ij} = [n_{ij1}, n_{ij2}, \ldots, n_{ijL}] \quad (64)$$

$$q \leftarrow q_{ij} = [q_{ij}[1], q_{ij}[2], \ldots, q_{ij}[k_{max}]] \quad (65)$$

The variable q is computed via the command q=accumarray (n,d) where $k_{min} \leq n_{ijl} \leq k_{max}$ for all l, $q_{ij}[k]=0$ for all indexes $k < k_{min}$. An example of pseudocode to be run by the processing device for implementation of the proposed algorithm for efficiently computing $G_l^{(m)}$ is given below.

■ Subroutine 1: Pseudocode for computing $G_l^{(m)}$ for l = 1, 2, ..., L
for i = 1, 2, ..., I do
  for j = 1, 2, ..., J do
    SET $q_{ij}[k] = 0$ for $0 \leq k < k_{min}$
    for k = $k_{min}$, $k_{min}$ + 1, ..., $k_{max}$ do
      $S_k$ = {l = 1, 2, ..., L:$n_{ijl}$ = k}

-continued $$q_{ij}[k] = \sum_{l \in S_k} d_{ijl}^{(m)} \quad \text{(hash-table-implementation)}$$

```
        end for
        ŝ_ij^(m)[n] = (q_ij * w)[n]
        for l = 1, 2, ..., L do
            Ĝ_ijl^(m) = {(w * (y_ij - ŝ_ij^(m)))[k]}|_{k=n_ijl}
        end for
    end for
end for
```

$$\hat{G}_l^{(m)} = \sum_{i=1}^{I} \sum_{j=1}^{J} \alpha_{ijl} \cdot \hat{G}_{ijl}^{(m)}$$

In addition to being more computationally efficient, the proposed implementation does not require constructing the large system matrix A. A tangible benefit of this fact is the size of data (i.e., the number of transmit locations) that can be used to form an image is no longer limited. It is also readily observed from the pseudocode that the computation of $\hat{G}_l^{(m)}$ is parallelizable such that faster processing techniques such as parallel or GPU based processing can be used to process the data.

Fast Implementation of $H_l$

An alternative expression for $H_l$ in (6) is $$H_l = \sum_{i=1}^{I} \sum_{j=1}^{J} \sum_{n=1}^{N} (\alpha_{ijl})^2 \cdot r_{ijn} \cdot \beta(nT_s - \tau_{ijl}), \quad (66)$$

where $\beta(t) \triangleq p^2(t)$ and $r_{ijn}$ is the number of non-zero elements in the $n^{th}$ row of the N×L sub-matrix $A_{ij}=P_{ij}D_{ij}$. To facilitate a fast implementation, we approximate the quantity $H_l$ by $$\hat{H}_l = \sum_{i=1}^{I} \sum_{j=1}^{J} \sum_{n=1}^{N} (\alpha_{ijl})^2 \cdot r_{ijn} \cdot \beta(nT_s - n_{ijl}T_s), \quad (67)$$

We write $\hat{H}_l$ as $$\hat{H}_l = \sum_{i=1}^{I} \sum_{j=1}^{J} (\alpha_{ijl})^2 \cdot \hat{H}_{ijl} \quad (68)$$

where $$\hat{H}_{ijl} = \sum_{n=0}^{N-1} r_{ijn} \cdot \beta(nT_s - n_{ijl}T_s) \quad (69)$$

$$= \sum_{n=0}^{N-1} \gamma_{ij}[n] \cdot h[n - n_{ijl}] \quad (70)$$

$$= \left\{ \sum_{n=1}^{N} \gamma_{ij}[n] \cdot h[n-k] \right\} \Bigg|_{k=n_{ijl}} \quad (71)$$

$$= \left\{ \sum_{n=1}^{N} \gamma_{ij}[n] \cdot h[k-n] \right\} \Bigg|_{k=n_{ijl}} \quad (72)$$

$$= \{(\gamma_{ij} * h)[k]\}|_{k=n_{ijl}} \quad (73)$$

with $h[n] \triangleq \beta(nT_s)$, and $r_{ijn}$ is now represented by the n-indexed sequence $\gamma_{ij}[n] \triangleq r_{ijn}$. For the sake of convenience and consistency, we assume here that rows of a matrix are counted starting from a zeroth row. The computation $\hat{H}_{ijl}$ requires the convolution of the squared and discretized pulse h[n] with the sequence $\gamma_{ij}[n]$. The computation of $\hat{H}_{ijl}$ is significantly accelerated with the introduction of a fast procedure for generating $\gamma_{ij}[n]$.

First, we recall that the sample $\gamma_{ij}[n]$ is the number of non-zeros entries in the $n^{th}$ row of the N×L sub-matrix $A_{ij}$. Because the radar system has an ultra wide band, the transmitted pulse p(t) is short. Consequently, the samples of the length-N sequence w[n] are zero (or practically zero) for indexes n such that |n|<M and non-zero, otherwise. The parameter M is even and significantly smaller than N. The $l^{th}$ column of $A_{ij}$ coincides with the length-N vector $$[\alpha_{ijl} p(0-\tau_{ijl}), \alpha_{ijl} p((T_s-\tau_{ijl}), \ldots, \alpha_{ijl} p((N-1)T_s-\tau_{ijl})]^T \quad (74)$$

The (n,l)-entry of $A_{ij}$ is thus non-zero if $$|nT_s - \tau_{ijl}| \leq MT_s. \quad (75)$$

Using (44), the above rule in (75) can be approximated by $$|n - n_{ijl}| \leq M. \quad (76)$$

A computed delay index $n_{ijl}$ is such that $0 \leq n_{ijl} \leq N$. Consequently, for computational convenience, we write that the (n,l)-entry of $A_{ij}$ is non-zero if $$\max(0, n-M) \leq n_{ijl} \leq \min(n+M, N). \quad (77)$$

The number $\gamma_{ij}[n]$ of non-zeros entries in the $n^{th}$ row of $A_{ij}$ is thus equal to the number of elements in the $n^{th}$ row that satisfy (77). A more convenient definition is $$\gamma_{ij}[n] = |\mathcal{R}_n| \quad (78)$$

where $|\mathcal{R}_n|$ denotes the number of elements in the set $$\mathcal{R}_n = \{l=1,2,\ldots,L | \max(0,n-M) \leq n_{ijl} \leq \min(n+M,N)\}. \quad (79)$$

The parameter $\gamma_{ij}[n]$ can be efficiently computed by taking advantage of the hash-table-based fast implementation concept used in (60). First, we write $$\gamma_{ij}[n] = |\mathcal{R}_n^+| - |\mathcal{R}_n^-| \quad (80)$$

where $$\mathcal{R}_n^+ = \{l=1,2,\ldots,L | n_{ijl} \leq \min(n+M,N)\} \quad (81)$$

$$\mathcal{R}_n^- = \{l=1,2,\ldots,L | n_{ijl} \leq \max(0,n-M-1)\}. \quad (82)$$

The expression in (80) is further expanded as $$\gamma_{ij}[n] = \sum_{k=0}^{\min(n+M,N)} |S_k| - \sum_{k=0}^{\max(0,n-M)} |S_k| \quad (83)$$

Finally, we have $$\gamma_{ij}[n] = v[\min(n+M,N)] - v[\max(0,n-M)] \quad (84)$$

where $$v[m] = \sum_{k=0}^{m} |S_k| \quad (85)$$

with $S_k = \{l=1, 2, \ldots, L: n_{ijl}=k\}$. The inner summation in (85) (and, hence the computation of v[m]) is efficiently computed using the hash-table-based fast implementation previously discussed and used in (60). Example pseudocode to be run by the processing device for implementation of the proposed algorithm for efficiently computing $H_l$ is given below.

■ Subroutine 2: Pseudocode for computing $H_l$ for $l = 1, 2, \ldots, L$
```
for i = 1, 2, . . . , I do
    for j = 1, 2, . . . , J do
        SET q[k] = 0 for 0 ≤ k < k_min
        for k = k_min, k_min + 1, . . . , k_max do
            S_k = {l | l = 1, 2, . . . , L:n_ijl = k}
            q[k] = |S_k| (hash-table-implementation)
        end for
        for m = 0, 1, . . . , N do
```
$$\nu[m] = \sum_{k=0}^{m} q[k]$$
```
        end for
        for n = 0, 1, . . . , N do
            γ_ij[n] = w[min(n + M, N)] − w[max(0, n − M)]
        end for
        for l = 1, 2, . . . , L do
            Ĥ_ijl = {(γ_ij * h)[k]}_{k−n_ijl}
        end for
    end for
end for
```
$$\hat{H}_l = \sum_{i=1}^{I} \sum_{j=1}^{J} (\alpha_{ijl})^2 \cdot \hat{H}_{ijl}$$

Putting together the results for calculating terms $G_l^{(m)}$ and $H_l$, example pseudocode for the $l_1$-LS algorithm follows.

■ Pseudocode for computing $l_1$-LS algorithm for $m = 1, 2, \ldots, \text{num}_{it}$
```
Initialization: x^(0) = {x_1^(0), x_2^(0), . . . , x_L^(0)}
for l = 1, 2, . . . , L do
    Compute Ĥ_l (via Subroutine 2)
end for
for m = 1, 2, . . . , num_it do
    for l = 1, 2, . . . , L do
        Compute Ĝ_l^(m) (via Subroutine 1)
    end for
```
$$x_l^{(m+1)} = \frac{\hat{H}_l \cdot x_l^{(m)} + \hat{G}_l^{(m)}}{\hat{H}_l + \frac{\lambda}{2|x_l^{(m)}|}}$$
```
end for
```

So configured, the described MM-based $l_1$-LS algorithm is applicable to large-scale, real applications. Although the proposed algorithm effectively estimates reflection coefficients of scenes-of-interest using GPR datasets, the algorithm could be readily applied to a variety of applications where datasets are collected using synthetic aperture imaging measurement principles. When compared to images produced by the DAS or RSM algorithms, the image obtained using the MM-based $l_1$-LS algorithm is more accurate, is less noisy, and captures the main scatterers in the scene-of-interest while effectively suppressing shadows and side lobes. Although the proposed algorithm is still more computationally expensive than the DAS algorithm, a derived acceleration technique produces a fast-implementation version that is very fast and requires substantially less memory. Moreover, because the algorithm decouples the estimation of individual reflectance coefficients, further computational speed gains are achievable via parallel and GPU processing implementations.

Figure 6:
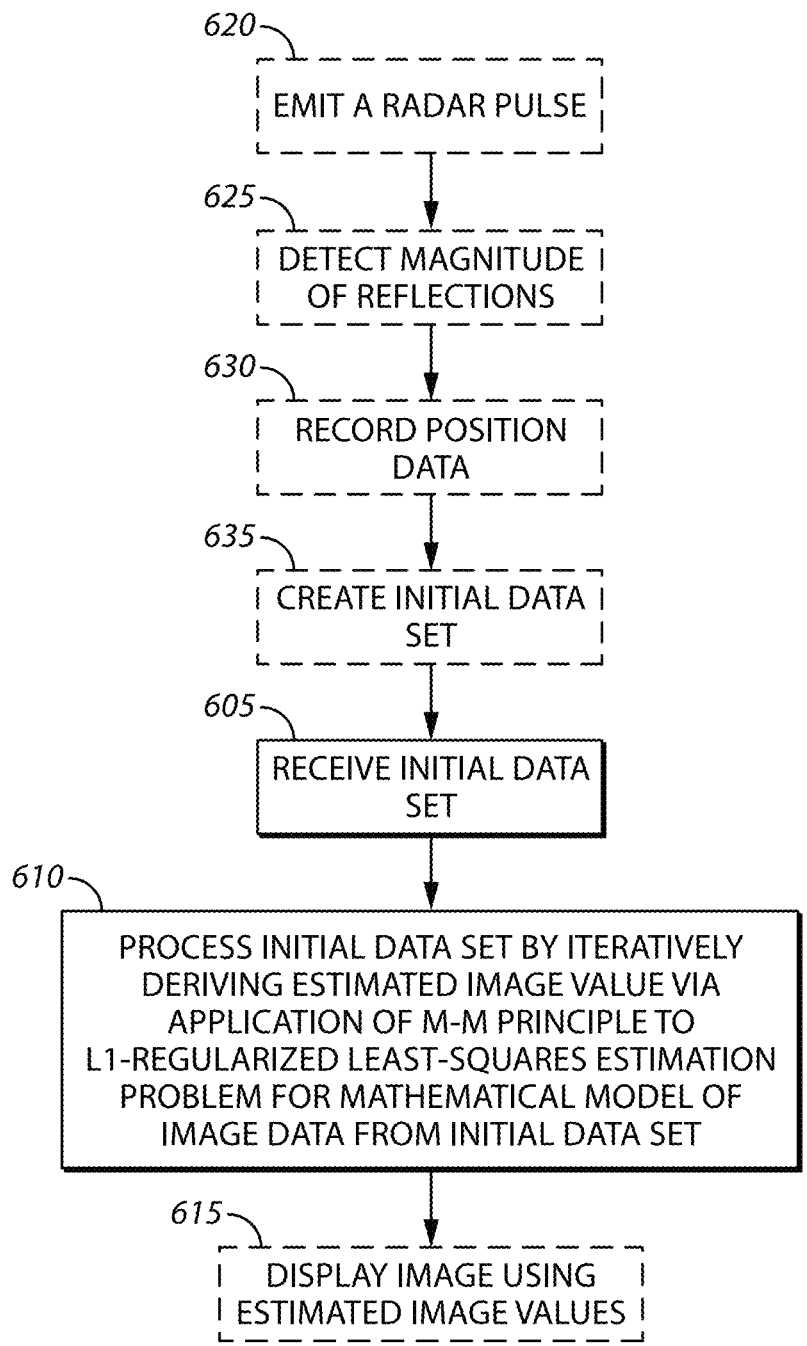
FIG. 6 comprises a flow diagram of an example algorithm applying the M-M principle to an L1-LS estimation as configured in accordance with various embodiments of the invention.

By one approach, the method described above can be implemented as illustrated in FIG. 6, where a processing device receives 605 an initial data set and processes 610 the initial data set by creating an estimated image value for each voxel in the image by iteratively deriving the estimated image value through application of a majorize-minimize principle to solve an $l_1$-regularized least-squares estimation problem associated with a mathematical model of image data from the initial data set. These basic steps can be applied to achieve fast and computationally efficiently prepared image using the estimated image value of individual voxels of the image that can be displayed 615, wherein the initial data set may be sourced from a variety of applications where datasets are collected using synthetic aperture imaging measurement principles. In the GPR context, the method may further include emitting 620 a radar pulse at specified intervals into a scene-of-interest and detecting 625 magnitude of signal reflections from the scene of interest from the radar pulse. Position data is recorded 630 corresponding to individual radar pulse emissions and individual receptions of the signal reflections. The initial data set in this application is created 635 from the position data and detected magnitudes of the signal reflections. Where the method is carried out remote from the vehicle, it is sufficient where the receipt of the initial data set to be processed includes receiving data representing transmission site locations of radar pulses, reception site locations of reception of reflections from the radar pulses, radar-return profiles for pairings of the transmission site locations and the reception site locations, and data samples associated with individual radar-return profiles.

Results for the MM-Based $l_1$-LS Algorithm

The performance of the MM-based $l_1$-LS algorithm can be evaluated using a numerical experiment and using a real dataset as obtained using a UWB SIRE apparatus and provided by the US Army Research Laboratory.

Figure 7:
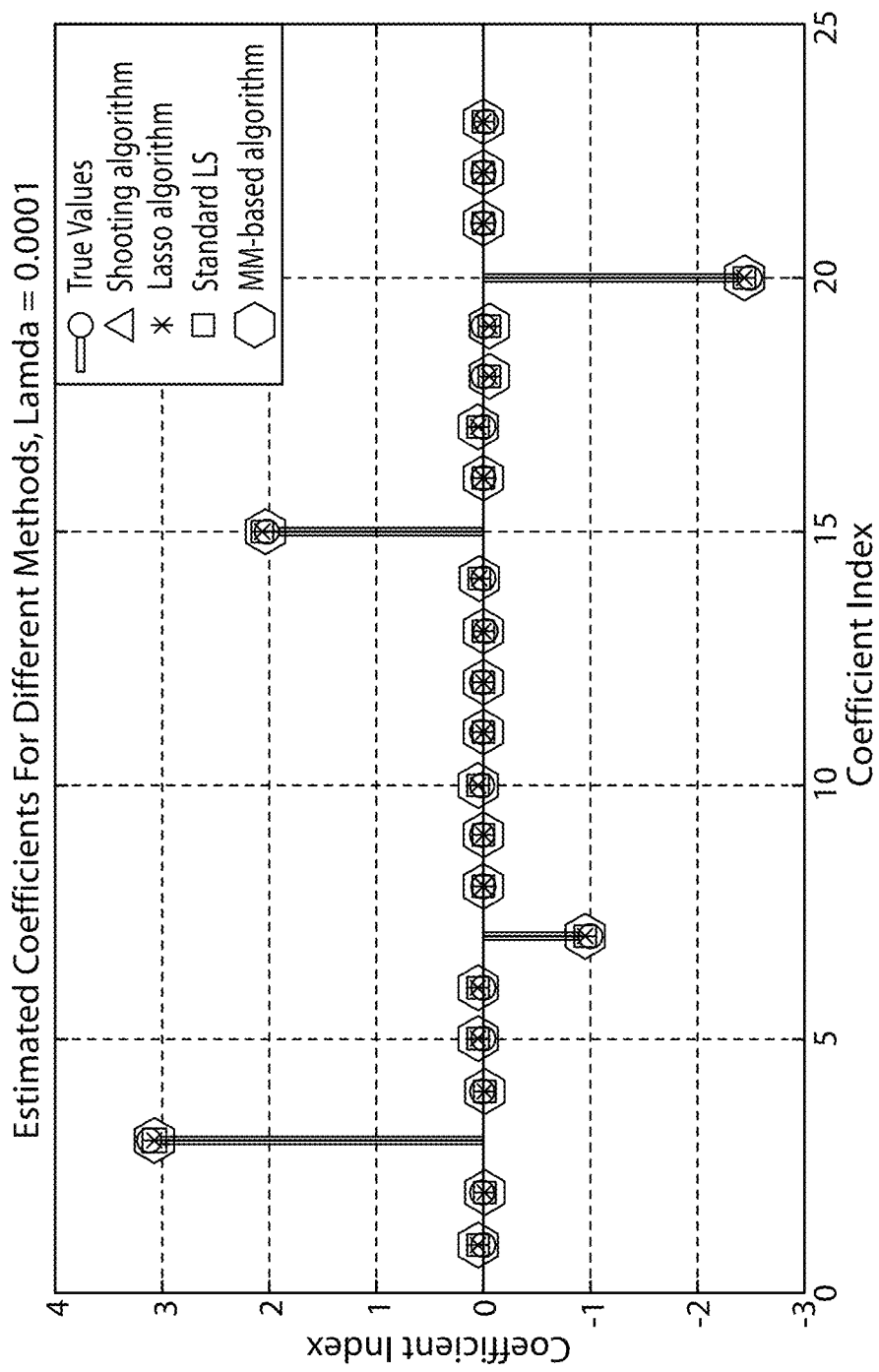
FIG. 7 comprises a graph displaying accuracies of various algorithms as applied to processing a given data set.

With reference to FIG. 7, the numerical experiment demonstrates that the accuracy of the proposed algorithm is comparable to that of existing standard $l_1$-LS algorithms despite the described computational efficiencies over these algorithms. In the numerical experiment, a length-N data vector y is generated using the standard additive white Gaussian (AWGN) noise model y=Ax+w, where x is a length-L vector of regression coefficients and w is an AWGN vector with variance $\sigma^2$. The numerical values for the parameters are N=500, L=23 and $\sigma^2$=1. The 500×23 system matrix A is randomly generated. FIG. 7 illustrates the estimation accuracy of the proposed MM-based $l_1$-LS algorithm as compared to that of previously used algorithms including the LASSO, the shooting, and the standard $l_1$-LS algorithms. As illustrated, the accuracies of these various algorithms are substantially overlapping meaning that the accuracies are approximately the same. As discussed above, while all algorithms give comparable performance results where the data size is relatively small, when the data size is large such as in a GPR application, only the proposed $l_1$-LS can produce a result using reasonable computing resources, i.e., processing and memory resources. For instance, the LASSO, the shooting, and the $l_1$-LS algorithms fail due to memory size limitations.

Figure 8:
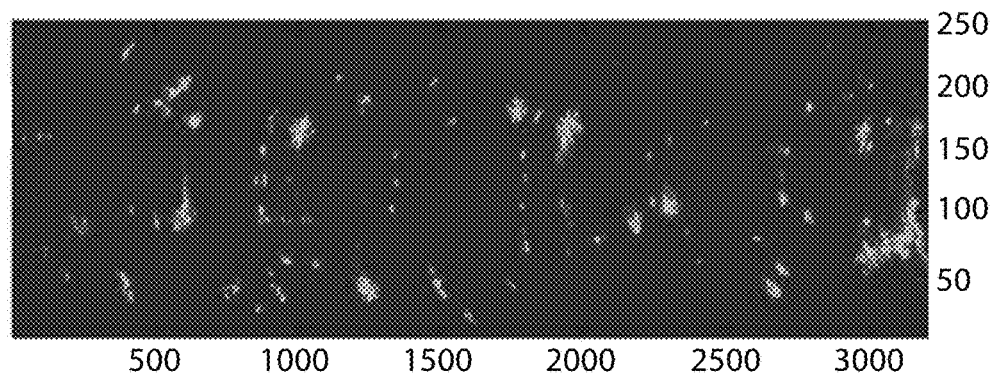
FIG. 8 comprises a displayed image of objects in a SOI using image data processed according to an M-M application to an L1-least squares method as configured in accordance with various embodiments of the invention.
Figure 9:
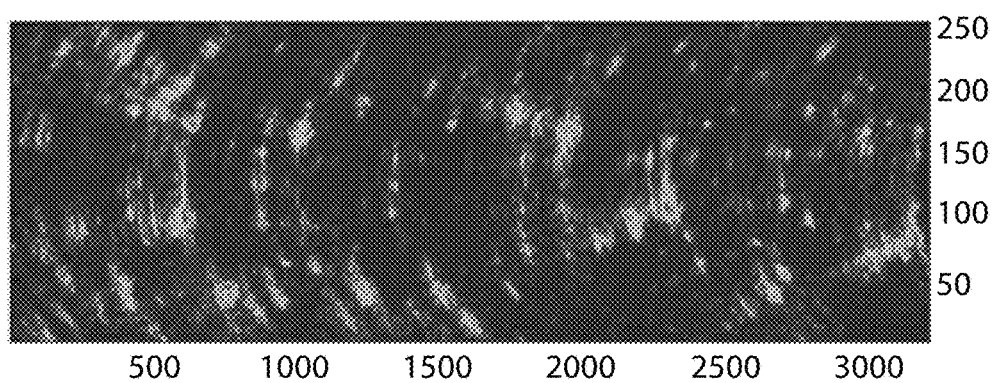
FIG. 9 comprises a displayed image of the objects in the SOI of FIG. 8, in this case using image data processed according to a prior art DAS method.
Figure 10:
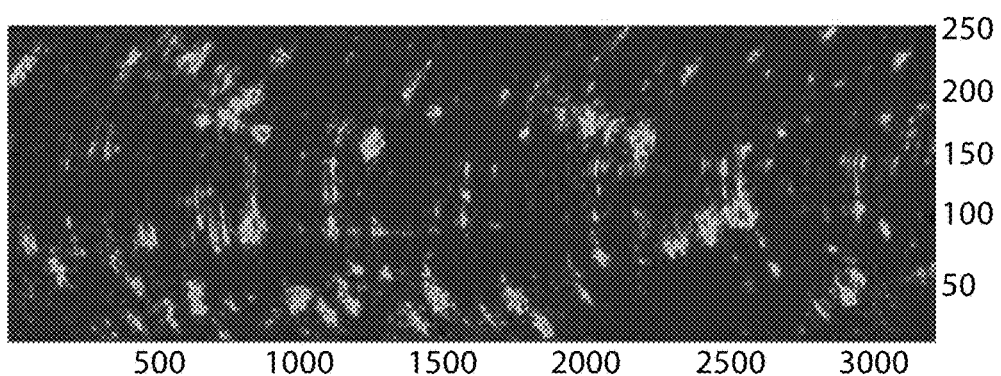
FIG. 10 comprises a displayed image of the objects in the SOI of FIG. 8, in this case using image data processed according to a prior art RSM method.

FIGS. 8-10 illustrate the images provided by application of the MM-based $l_1$-LS algorithm (FIG. 8) to data collected by UWB SIRE system as compared to the images provided by the DAS (FIG. 9) and RSM (FIG. 10) algorithms as applied to the same data set. This test data set corresponds to measurements taken from I=274 consecutive transmit locations using J=16 receive antennas. The scene-of-interest is of size 65×25 m$^2$, and is divided into a grid of 250 voxels in the cross-range direction and 3200 voxels in the down-range direction. The voxels have each 0.1 m in the cross-range direction and 0.02 m in the down-range direction. These parameters and their values are summarized below in Table 1.

TABLE 1

Parameters for the real data

| Parameter | Value |
| --- | --- |
| Image dimension | 25 m (cross-range) by 65 m (range) |
| Voxel size | 0.1 m (cross-range) by 0.02 m (range) |
| Number of transmit locations | 274 |
| Transmit locations per sub-aperture | 43 |
| Sub-aperture dimension (cross-range) | 25 m (cross-range) by 2 m (range) |

FIGS. 8-10 show complete images of the scene-of-interest that are generated using the DAS, MM-based $l_1$-LS, and RSM algorithms. FIG. 9 shows the image obtained using the DAS algorithm. The image has significant side lobes and shadows. Moreover, the presence of background noise is clearly visible. FIG. 10 shows the image obtained using the RSM algorithm. Although, side lobes and shadows are reduced, there is still room for improvement. The image obtained using the proposed $l_1$-LS algorithm, shown in FIG. 8, is sparser and adequately suppresses both the side lobes and background noise.

Another Approach: MM-Based Least Absolute Deviation (LAD) Algorithm with $l_1$-Regularization A second approach to application of the MM principle to processing an image data set includes application of this principle to a different approach to the least squares technique. More specifically, such a method includes creating an estimated image value for each voxel in the image by iteratively deriving the estimated image value through application of an MM principle to solve the $l_1$-regularized least-absolute deviation (LAD) estimation problem associated with a mathematical model of image data from the initial data set.

The so called $l_1$-regularized LAD estimation problem is a known approach to the least squares regression analysis. This approach is known to handle outlier data in a better or more robust fashion, but at the cost of increased computational resources. In this approach, the reflectance coefficient vector, which represents objects in the SOI to be detected, is estimated using the $l_1$-regularized least absolute deviation ($l_1$-LAD) method:

$$\hat{x} = \operatorname*{argmin}_{x} \|y - Ax\|_1 + \lambda \|x\|_1, \tag{86}$$

where $\lambda$ is the regularization parameter. We solve the optimization problem in (86) using the MM principle as shown by D. R. Hunter and K. Lange, "A tutorial on mm algorithms," The American Statistician, vol. 58, no. 1, pp. 30 to 37, 2004, which is incorporated herein by reference. The resulting algorithm is straightforward-to-implement, computationally efficient and amenable to parallel (or distributed) implementations.

The MM principle is described above. To solve the GPR image formation problem in (86) using the MM principle, the objective function to be minimized can be written as $$\varphi(x) = \varphi_1(x) + \lambda \varphi_2(x) \tag{87}$$

where $\varphi_1(x) = \|y - Ax\|_1$, $\varphi_2(x) = \|x\|_1$, and the regularization parameter $\lambda$ is positive. A quadratic majorizer for the absolute value function $f(x) = |x|$ is given by De Leeuw and Lange as referenced above. From that result, it directly follows that for any real $x^{(m)} \neq 0$ $$Q_2(x, x^{(m)}) = \sum_{l=1}^{L} \frac{x_l^2}{2|x_l^{(m)}|} + \frac{1}{2}|x_l^{(m)}| \tag{88}$$

is a majorizing function for $\varphi_2(x) = \sum_{l=1}^{L} |x_l|$ at the point $x^{(m)}$.

A majorizing function for $\varphi_1(x)$ is now constructed by first replacing the absolute value function by De Leeuw and Lange's majorizing function for the absolute value function $$\phi_1(x) = \sum_{k=0}^{K-1} |y_k - [Ax]_k| \leq \tag{89}$$

$$\sum_{k=0}^{K-1} \frac{(y_k - [Ax]_k)^2}{2|y_k - [Ax^{(m)}]_k|} + \frac{|y_k - [Ax^{(m)}]_k|}{2}. \tag{90}$$

Next, we replace the term $(y_k - [Ax]_k)^2$ above by a majorizing function developed by De Pierro as referenced above. More specifically, De Pierro showed that $([Ax]_k)^2$ is majorized by $$q(x, x^{(m)}) \triangleq \sum_{l=1}^{L} C_{kl}\left(N_k A_{kl} x_l - N_k A_{kl} x_l^{(m)} + [Ax^{(m)}]_k\right)^2 \tag{91}$$

where $N_k$ is the number of non-zero elements in the $k^{th}$ row of the system matrix A and $C_{kl}$ is defined by $$C_{kl} \triangleq \begin{cases} N_k^{-1}, & A_{kl} \neq 0 \\ 0, & A_{kl} = 0 \end{cases}. \tag{92}$$

It then follows that $$(y_k - [Ax]_k)^2 = y_k^2 - 2y_k[Ax]_k + ([Ax]_k)^2 \tag{93}$$

$$\leq y_k^2 - 2y_k[Ax]_k + q(x, x^{(m)}). \tag{94}$$

where q is given by (28). From (90) and (94) it can be seen that a majorizing function for $\varphi_1$ at the point $x^{(m)}$ is $$Q_1(x, x^{(m)}) \triangleq \sum_{k=0}^{K-1} \frac{y_k^2 - 2y_k[Ax]_k + q(x, x^{(m)})}{2|y_k - [Ax^{(m)}]_k|} + \sum_{k=0}^{K-1} \frac{1}{2}|y_k - [Ax^{(m)}]_k|. \tag{95}$$

Because the penalty factor $\lambda$ is positive, a majorizing function for the objective function $\varphi(x) = \varphi_1(x) + \lambda \varphi_2(x)$ is $$Q(x, x^{(m)}) = Q_1(x, x^{(m)}) + \lambda Q_2(x, x^{(m)}) \tag{96}$$

where $Q_2$ is given by (31). From the general expression in (17), we obtain the desired iterative algorithm by setting to zero the partial derivatives of $Q(x, x^{(m)})$ with respect to the components of x. For $l = 1, 2, \ldots, L$, $$\frac{\partial Q}{\partial x_l} = \frac{\partial}{\partial x_l} \sum_{k=0}^{K-1} \frac{y_k^2 - 2y_k[Ax]_k + q(x, x^{(m)})}{2|y_k - [Ax^{(m)}]_k|} + \tag{97}$$

-continued $$\frac{\partial}{\partial x_l} \sum_{k=0}^{K-1} \frac{1}{2} |y_k - [Ax^{(m)}]_k| + \lambda \cdot \frac{\partial}{\partial x_l} \sum_{l=1}^{L} \left[ \frac{x_l^2}{2|x_l^{(m)}|} + \frac{1}{2}|x_l^{(m)}| \right].$$

Computing the derivatives in (97), simplifying and re-arranging terms gives $$\frac{\partial Q}{\partial x_l} = \left( \sum_{k=0}^{K-1} \frac{N_k A_{kl}^2}{|y_k - [Ax^{(m)}]_k|} + \frac{\lambda}{2|x_l^{(m)}|} \right) \cdot x_l - \left( \sum_{k=0}^{K-1} \frac{N_k A_{kl}^2}{|y_k - [Ax^{(m)}]_k|} \right) \cdot x_l^{(m)} - \sum_{k=0}^{K-1} \frac{A_{kl}(y_k - [Ax^{(m)}]_k)}{|y_k - [Ax^{(m)}]_k|}. \tag{98}$$

Setting the partial derivatives to zero leads to the proposed $l_1$-LAD algorithm $$x_l^{(m+1)} = \frac{D_l^{(m)} \cdot x_l^{(m)} + N_l^{(m)}}{D_l^{(m)} + \frac{\lambda}{|x_l^{(m)}|}}, \tag{99}$$

for l=1, 2, ..., L, and where the terms $D_l^{(m)}$ and $N_l^{(m)}$ are given by $$D_l^{(m)} = \sum_{k=0}^{K-1} \frac{N_k A_{kl}^2}{|y_k - [Ax^{(m)}]_k|} \tag{100}$$

$$N_l^{(m)} = \sum_{k=0}^{K-1} A_{kl} \cdot \text{sign}(y_k - [Ax^{(m)}]_k). \tag{101}$$

Using this approach, a processing device can be configured to iteratively derive from an initial data set an estimated image value for a given voxel. In GPR imaging, the initial data set received by the processing device may include receiving data representing transmission site locations of radar pulses, reception site locations of reflections from the radar pulses, radar-return profiles for pairings of the transmission site locations and reception site locations, and data samples associated with individual radar-return profiles. For instance, the above algorithm can be initialized using the reflectance coefficient estimates obtained from the standard DAS algorithm. In the general setting, the algorithm can be initialized using an arbitrary non-zero vector.

Like with the application of the MM principle to the $l_1$-LS algorithm, a processing device can be configured to use a fast implementation strategy for computing $D_l^{(m)}$ and $N_l^{(m)}$ with significant speed gain and minimal data/matrix storage. In one such approach, the mathematical expressions can be modified to reduce processing time and required memory by accounting for a symmetric nature of a given radar pulse, accounting for similar discrete time delays between transmission of a given radar pulse and reception of reflections from the given radar pulse, and accounting for a short duration of the given radar pulse. More specifically, a derivation of the fast implementation similar to that described above can be similarly applied to the equations for $D_l^{(m)}$ and $N_l^{(m)}$ to allow computing by application of hash-table-based computations, including using slight modifications of the pseudocode described above.

Thus, the fast implementation may include calculating the terms by computing $N_l^{(m)}$ by applying a hash-table based computation to $$q_{ij}[k] = \sum_{l \in S_k} d_{ijl}^{(m)} \tag{102}$$

More specifically, we can write $N_l^{(m)}$ as $$N_l^{(m)} = \sum_{i=1}^{I} \sum_{j=1}^{J} \alpha_{ijl} \cdot N_{ijl}^{(m)} \tag{103}$$

where $$N_{ijl}^{(m)} = \{w^*(\text{sign}(y_{ij} - s_{ij}^{(m)}))[k]\}|_{k=n_{ijl}}, \tag{104}$$

$$s_{ij}^{(m)}[n] = (q_{ij} * w)[n] \tag{105}$$

and $y_{ij}[k]$ is a $k^{th}$ sample of a radar-return profile associated with an $i^{th}$ transmit location and a $j^{th}$ receiver, $s_{ij}^{(m)}[k]$ is an $m^{th}$ estimate of a noise-free component of $y_{ij}[k]$, w is a discretized version of the given radar pulse, $\alpha_{ijl}$ represents attenuation of the given radar pulse during travel from an $i^{th}$ transmit location to an $l^{th}$ voxel and back to a $j^{th}$ receiver, and $n_{ijl}$ is a discrete time-delay corresponding to rounding a quotient of time for the given radar pulse to travel from a transmitter at the $i^{th}$ transmit location to the $l^{th}$ voxel and back to the $j^{th}$ receiver and a sampling interval, and * denotes discrete-time convolution.

Similarly, the fast implementation may include calculating the terms by computing $D_l^{(m)}$ by applying a hash-table based computation to $|S_k|$ where $|S_k|$ denotes a number of elements in the set $S_k$. More specifically, we can write $D_l^{(m)}$ as $$D_l^{(m)} = \sum_{i=1}^{I} \sum_{j=1}^{J} \alpha_{ijl}^2 \cdot D_{ijl}^{(m)} \tag{106}$$

where $$D_{ijl}^{(m)} = \left\{ \left( h * \left( \frac{\gamma_{ij}}{|y_{ij} - s_{ij}^{(m)}|} \right) \right)[k] \right\} \bigg|_{k=n_{ijl}}, \tag{107}$$

$$\gamma_{ij}[n] = v(\min(n + M, N)) - v(\max(0, n - M)), \tag{108}$$

$$v(m) = \sum_{k=0}^{M} |S_k| \tag{109}$$

and where h is a discretized version of a squared radar pulse and 2M+1 is a number of non-zero samples in the given radar pulse.

Figure 11:
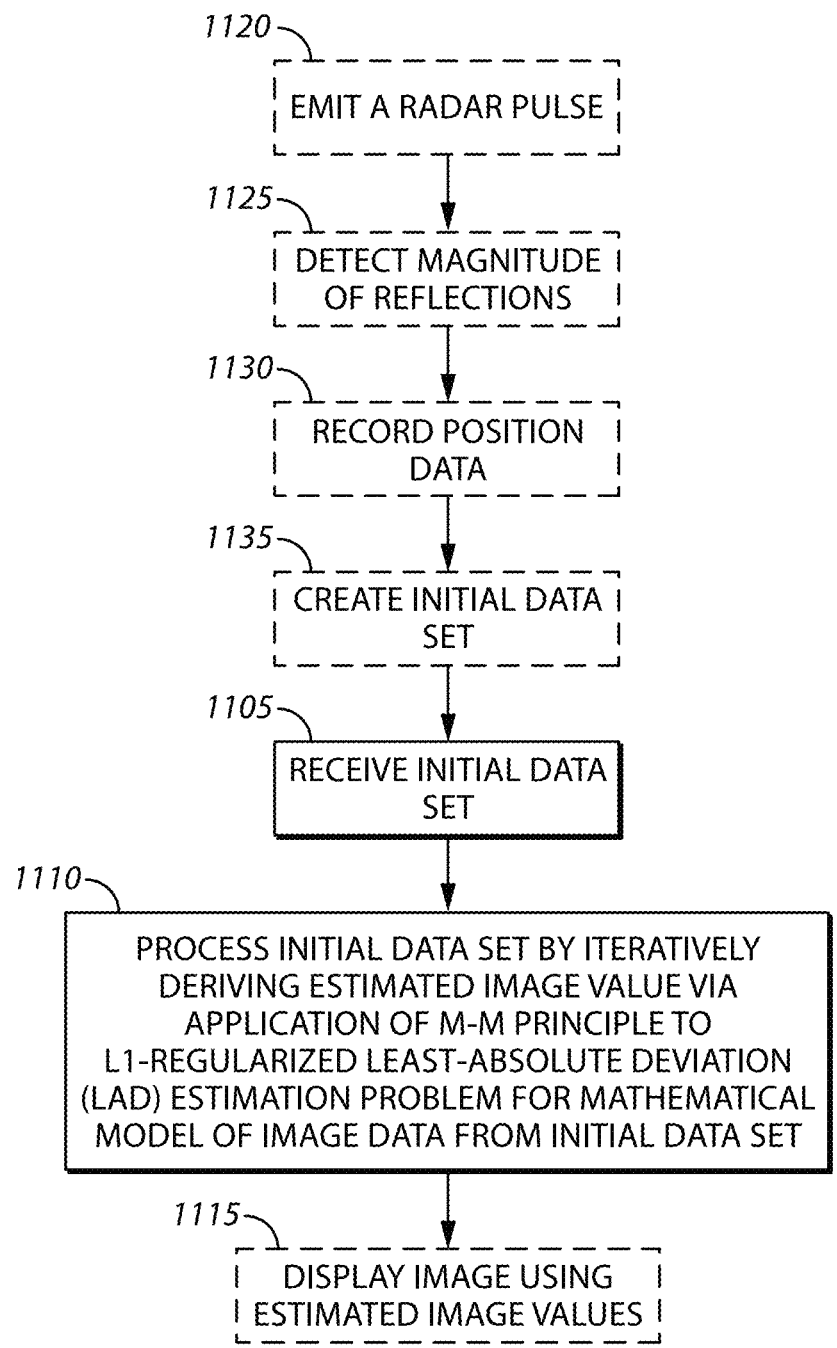
FIG. 11 comprises a flow diagram of an example algorithm applying the M-M principle to an L1-LAD estimation as configured in accordance with various embodiments of the invention.

By one approach, the method described above can be implemented as illustrated in FIG. 11, where a processing device receives 1105 an initial data set and processes 1110 the initial data set by creating an estimated image value for each voxel in the image by iteratively deriving the estimated image value through application of a majorize-minimize principle to solve an $l_1$-regularized least-absolute deviation (LAD) estimation problem associated with a mathematical model of image data from the initial data set. These basic steps can be applied to achieve fast and computationally efficiently prepared image with increased robust handling of data outliers using the estimated image value of individual voxels of the image that can be displayed 1115. Wherein the initial data set may be sourced from a variety of applications where datasets are collected using synthetic aperture imaging measurement principles. In the GPR context, the method may further include emitting 1120 a radar pulse at specified intervals into a scene-of-interest and detecting 1125 magnitude of signal reflections from the scene of interest from the radar pulse. Position data is recorded 1130 corresponding to individual radar pulse emissions and individual receptions of the signal reflections. The initial data set in this application is created 1135 from the position data and detected magnitudes of the signal reflections. Where the method is carried out remote from the vehicle, it is sufficient where the receipt of the initial data set to be processed includes receiving data representing transmission site locations of radar pulses, reception site locations of reception of reflections from the radar pulses, radar-return profiles for pairings of the transmission site locations and the reception site locations, and data samples associated with individual radar-return profiles.

So configured, a $l_1$-regularized least absolute deviation algorithm with application of the MM principle is easy to implement and robust to outliers. Although discussed herein largely with respect to GPR imaging, the proposed $l_1$-LAD algorithm is generally applicable to any data that fits a linear model where most of the unknown parameter values are zero. Preliminary results indicate that the described $l_1$-LAD algorithm adequately estimates the reflectance coefficients to allow for display of objects in the SOI and is noticeably more robust to outliers/spikes than other $l_1$-regularization algorithms. Although the proposed algorithm is more computationally expensive than some existing algorithms such as the standard DAS and LASSO algorithms, substantial gains in computational speed and memory-usage are attainable via application of the fast implementation techniques. Furthermore, because the estimation of reflectance coefficients is decoupled, parallel and/or distributed processing implementations can also be applied to increase computational speed.

Results for the MM-Based $l_1$-LAD Algorithm

Figure 12:
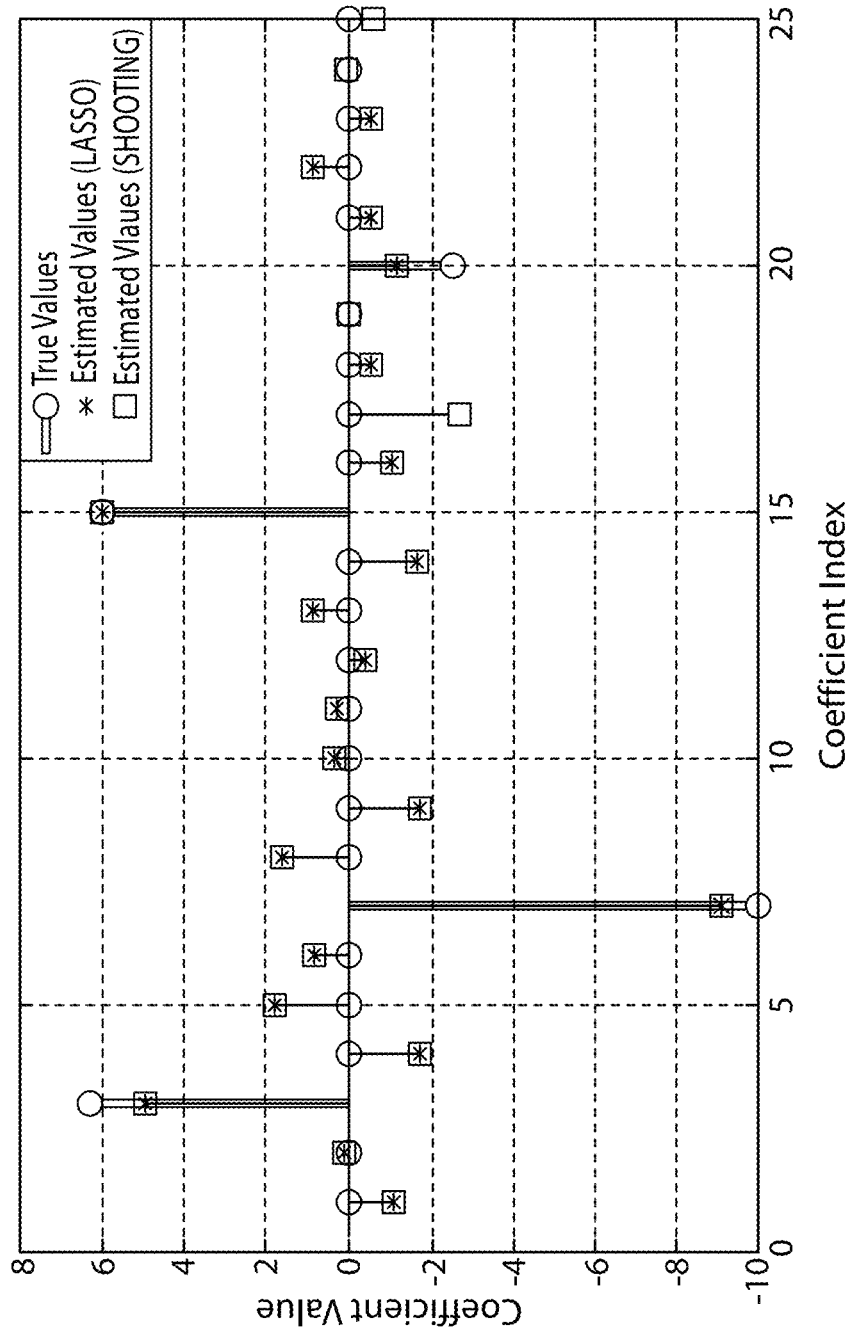
FIG. 12 comprises a graph displaying accuracies of various algorithms as applied to processing a given data set having an outlier.
Figure 13:
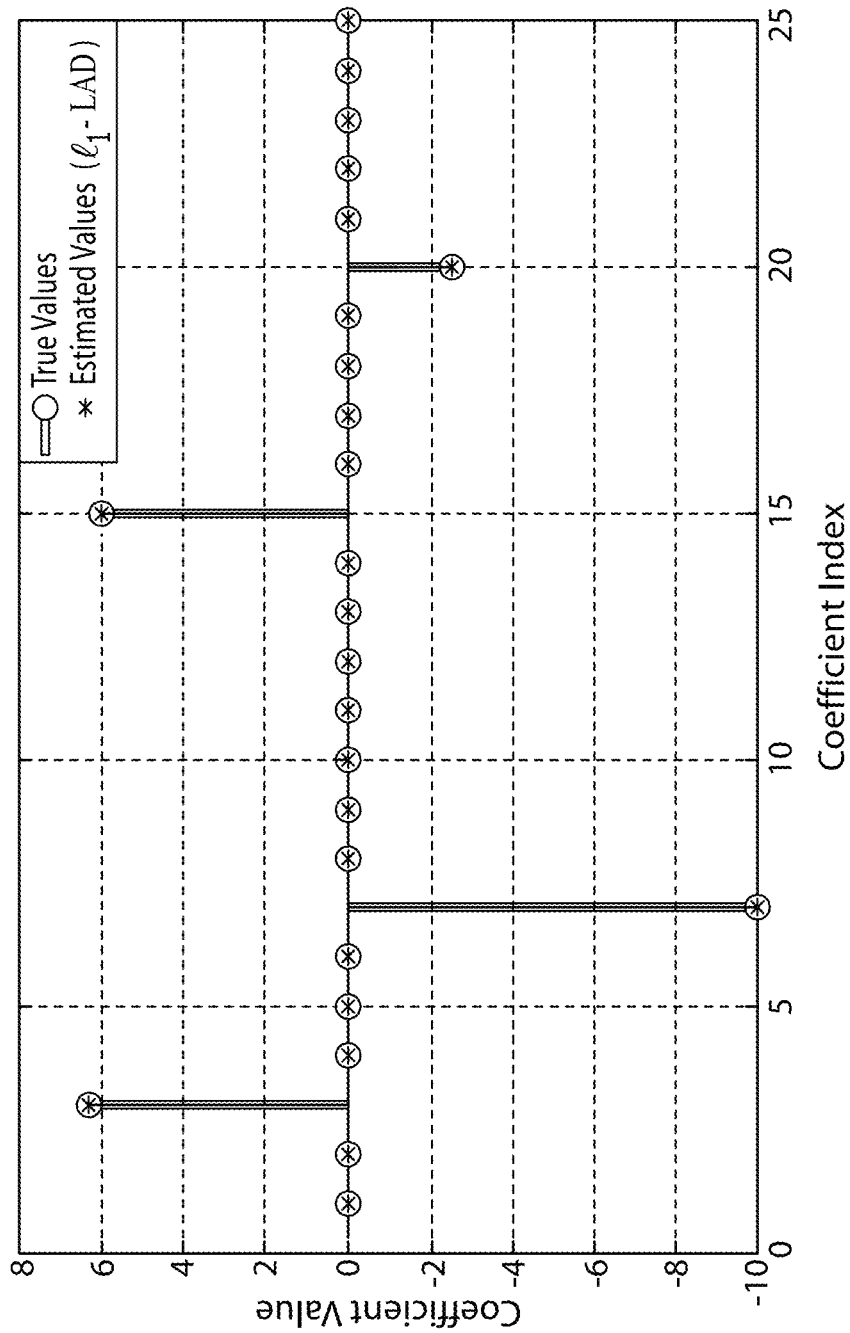
FIG. 13 comprises a graph displaying accuracy of an example algorithm applying the M-M principle to an L1-LAD estimation as applied to processing the given data set having an outlier of FIG. 12.

The proposed MM-based $l_1$-LAD algorithm was tested using a numerical experiment and simulated GPR data that closely mimics the measurements generated by the UWB SIRE system. The numerical experiment is used to illustrate, in the general setting, the robustness to outliers in the data that is processed by the various algorithms. To perform this test, a length-N data vector y is generated using the standard additive white Gaussian noise model y=Ax+w, where x is a length-L vector of regression coefficients and w is an AWGN vector with variance $\sigma^2$. The numerical values for the above parameters are N=500, L=25 and $\sigma^2$=1. The 500×23 system matrix A is randomly generated. FIGS. 12 and 13 show respectively the estimation results of the known DAS and LASSO algorithms and the MM-based $l_1$-LAD algorithm when a single erroneous outlier/spike is inserted into the observation data y.

FIG. 12 illustrates that the estimation performance of the DAS and LASSO approaches of the $l_1$-LS algorithms can be degraded by the presence of a single significant outlier. These numerical experimentations indicated that the level of inaccuracy in the $l_1$-LS estimate is commensurate with the number and magnitude of outliers.

Figure 14:
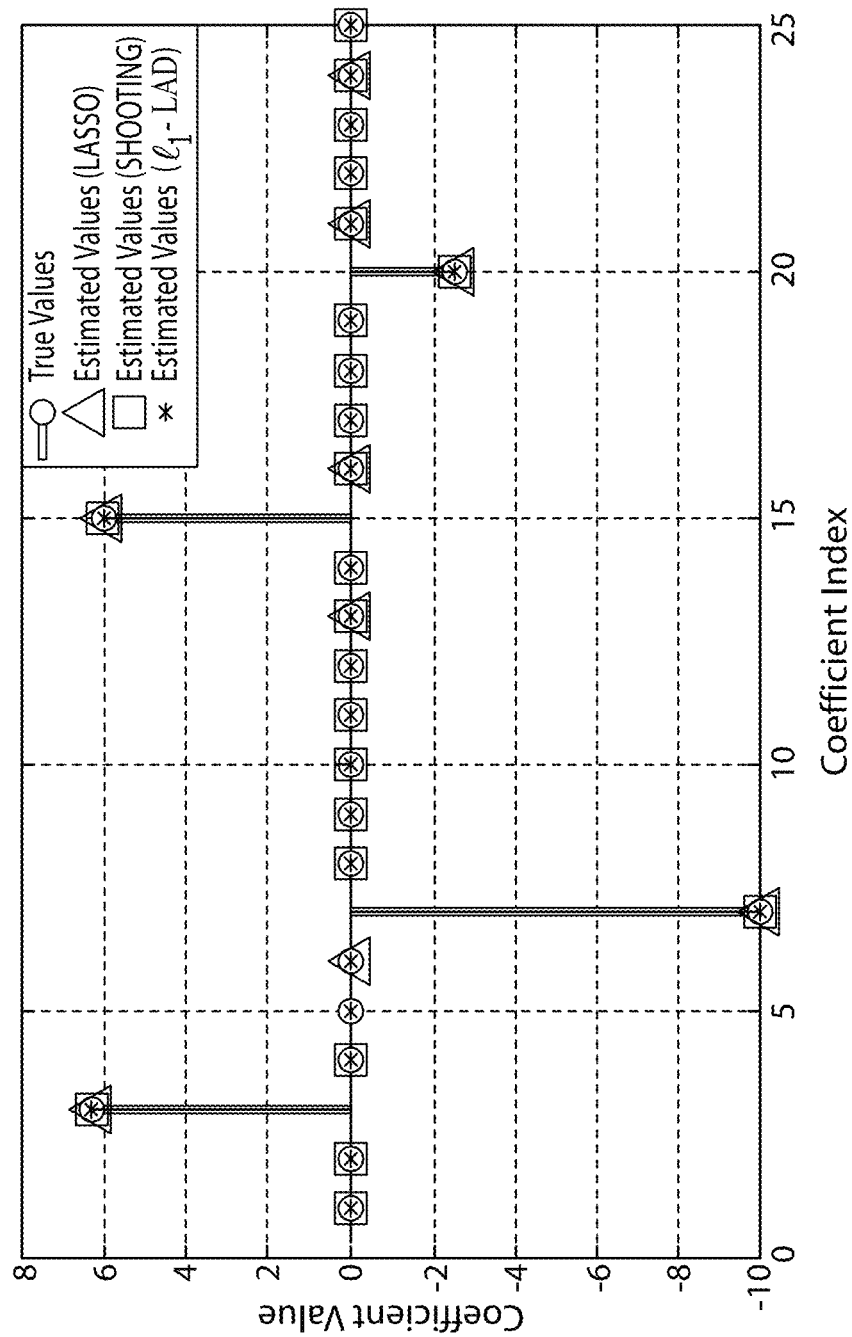
FIG. 14 comprises a graph displaying accuracies of various algorithms as applied to processing a given data set without outliers.
Figure 15:
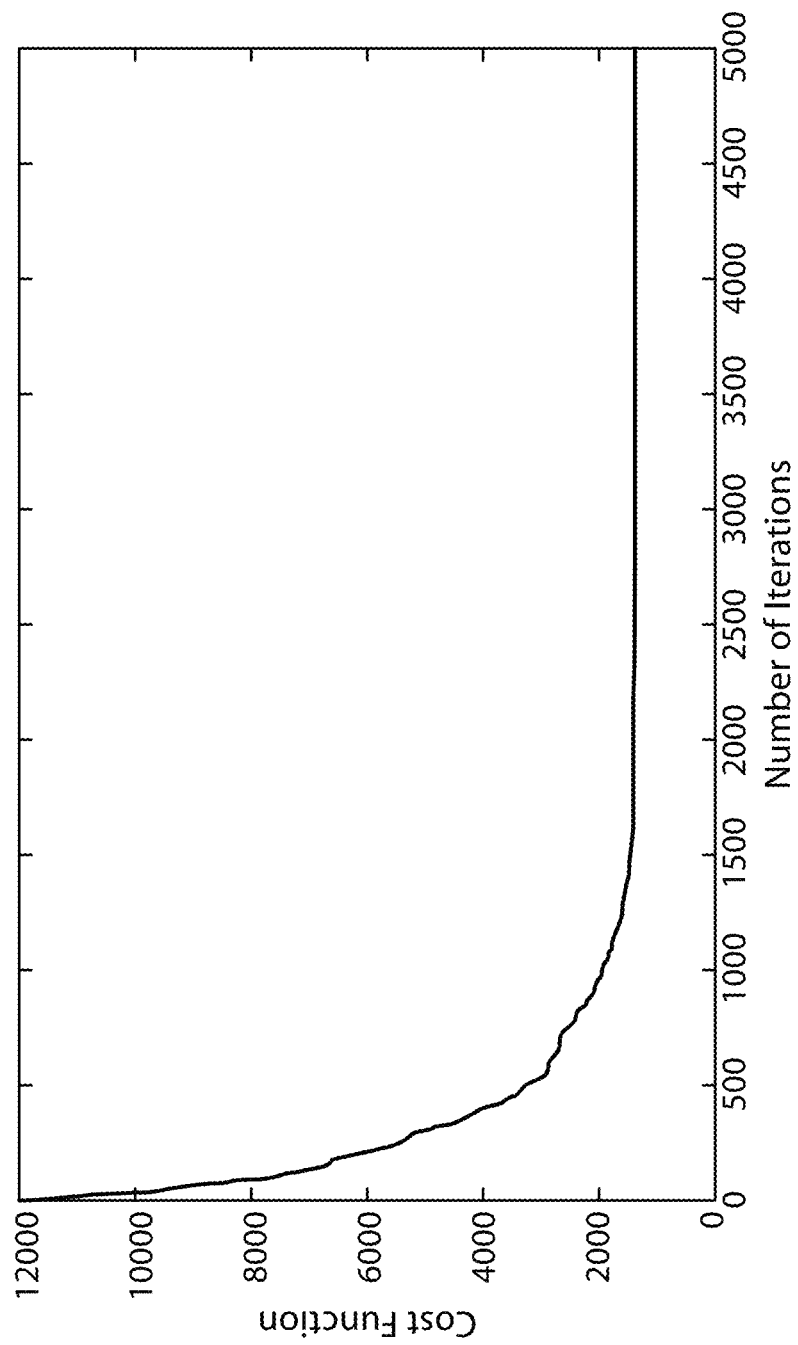
FIG. 15 comprises a graph displaying a cost function for an example algorithm applying the M-M principle to an L1-LAD estimation as configured in accordance with various embodiments of the invention.

In contrast, FIG. 13 shows that the proposed $l_1$-LAD approach is immune to the presence of the outlier as it properly estimates the regression coefficients. FIG. 14 illustrates that without outliers, the $l_1$-LAD and the DAS and RSM versions of the $l_1$-LS algorithms give adequate and comparable results In the outlier example, the iterative procedure of the described $l_1$-LAD algorithm was initialized with arbitrary/random values. The coefficients are estimated using 5000 iterations, although analysis of the algorithm's cost function of FIG. 15 demonstrates that a lesser number of iterations would have sufficed. FIG. 15 also illustrates that the cost function is monotonically decreasing.

Figures 16, 17:
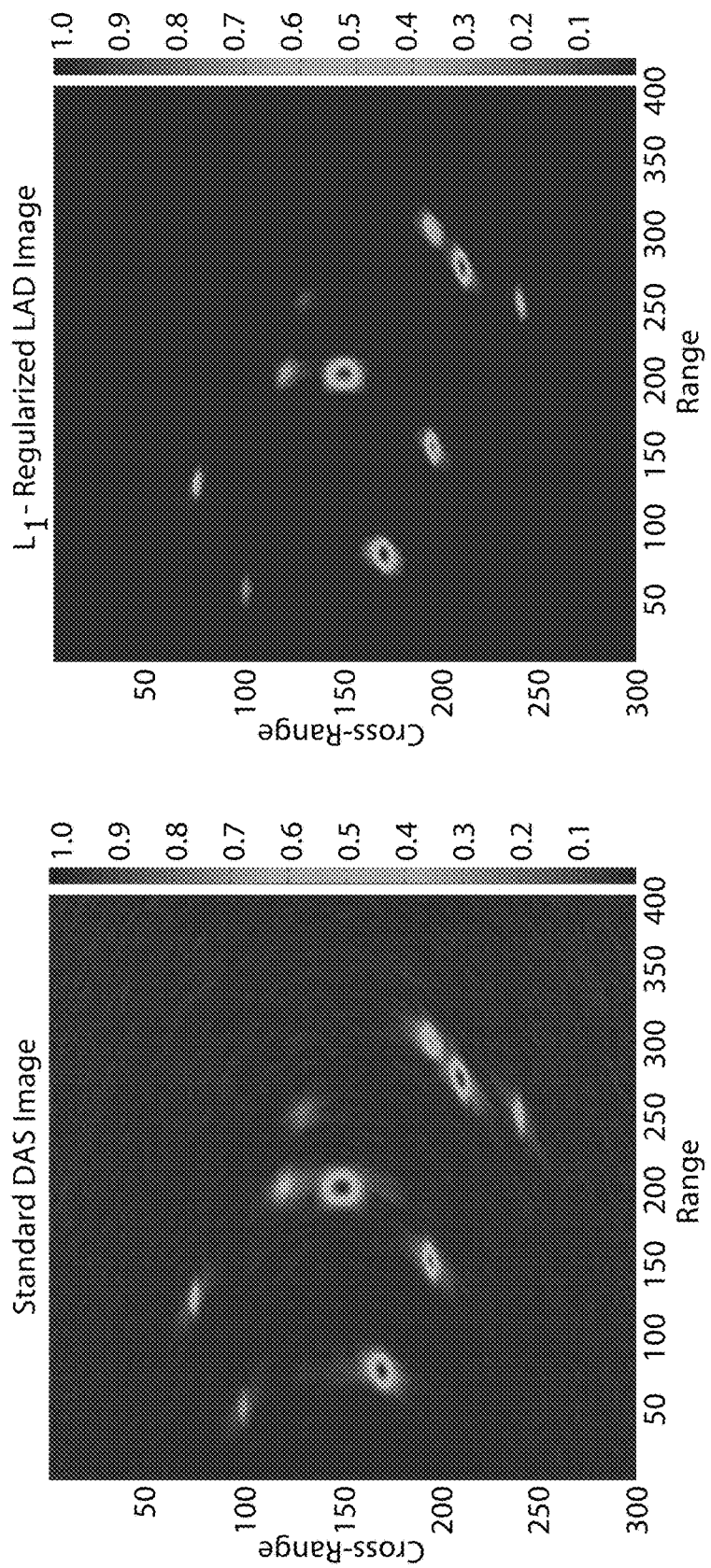
FIG. 16 comprises a displayed image of objects in a SOI using image data processed according to a prior art DAS algorithm.
FIG. 17 comprises a displayed image of the objects in the SOI of FIG. 16, in this case using image data processed according to an M-M application to an L1-LAD method as configured in accordance with various embodiments of the invention.

FIGS. 16 and 17 illustrate respectively images resulting from application of the DAS algorithm and the MM based $l_1$-LAD algorithm to the ARL simulated GPR data. FIG. 17 demonstrates removal of noise using the $l_1$-LAD algorithm as compared to FIG. 16's image created using the DAS algorithm. Moreover, the undesirable shadow-effects in the vicinity of scatterers, which are seen in the DAS image, are absent in the $l_1$-LAD image. Additionally, the described $l_1$-LAD algorithm retains the above results when erroneously large values are randomly added to the ARL dataset to mimic potential outliers and qualitatively test the robustness of the algorithm.

Figure 18:
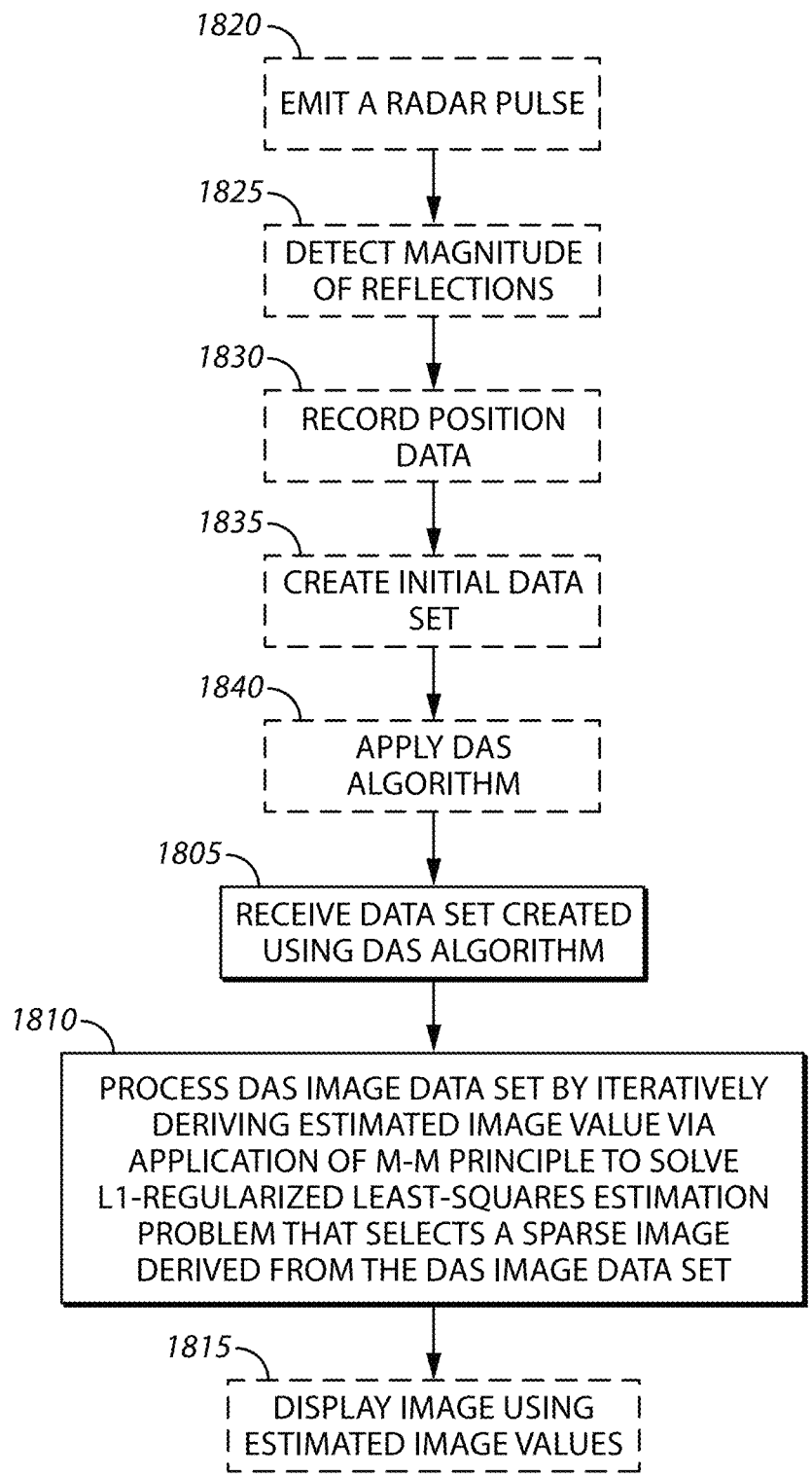
FIG. 18 comprises a flow diagram of an example algorithm applying the M-M principle to an L1-least squares estimation applied to an image data set from a DAS algorithm (L1-SIR) as configured in accordance with various embodiments of the invention.

Another Approach: Application of MM-Principle to $l_1$-Regularization of a DAS Derived Data Set A third approach to application of the MM principle to processing an image data set includes application to the $l_1$-regularized least squares problem within an image data set created through use of the DAS algorithm. More specifically, and with reference to FIG. 18, one such method includes receiving 1805 a DAS image data set created by applying a delay-and-sum (DAS) algorithm to an initial data set. The DAS image data set is processed 1810 with a processing device by creating an estimated image value for each voxel in the image by iteratively deriving the estimated image value through application of a majorize-minimize principle to solve an $l_1$-regularized least-squares estimation problem that selects a sparse image derived from the DAS image data set. This approach can be considered an $l_1$-Sparsity Improvement Restoration ($l_1$-SIR) algorithm.

These basic steps can be applied to achieve fast and computationally efficient image preparation to obtain the estimated image value of individual voxels of the image for display 1815. In the GPR context, the method may further include, when carried out on or local to the vehicle, emitting 1820 a radar pulse at specified intervals into a scene-of-interest and detecting 1825 magnitude of signal reflections from the scene of interest from the radar pulse. Position data is recorded 1830 corresponding to individual radar pulse emissions and individual receptions of the signal reflections. The initial data set in this application is created 1835 from the position data and detected magnitudes of the signal reflections. The DAS algorithm is applied 1840 to the initial data set to create the DAS image data set. Where the method is carried out remote from the vehicle, it is sufficient where the receipt of the image data set to be processed includes receiving data representing transmission site locations of radar pulses, reception site locations of reception of reflections from the radar pulses, radar-return profiles for pairings of the transmission site locations and the reception site locations, and data samples associated with individual radar-return profiles.

More specifically, let $x_{DAS}$ be the DAS image for some SOI We propose to reconstruct an improved image by minimizing the following $l_1$ regularized LS objective function $$\hat{x} = \underset{x}{\operatorname{argmin}} \|x_{DAS} - x\|_2^2 + \lambda \|x\|_1 \qquad (110)$$

where $\lambda > 0$ is the penalty or regularization parameter.

The optimization problem in (110) in this approach is solved using the MM principle as described above. The resulting algorithm is straightforward-to-implement, computationally efficient and amenable to parallel (or distributed) implementations.

A quadratic majorizing function for the absolute value function $f(x)=|x|$ is given by De Leeuw and Lange as referenced above. From their result, it follows that for any real L×1 vector $x^{(m)}$ without any zero elements a majorizing function for the function $\|x\|_1$ at the point $x^{(m)}$ is $$q(x, x^{(m)}) \triangleq \sum_{l=1}^{L} \left( \frac{x_l^2}{2|x_l^{(m)}|} + \frac{1}{2}|x_l^{(m)}| \right). \qquad (111)$$

In turn, it follows that a majoring function for the objective function in (110) at the point $x^{(m)}$ is $$Q(x, x^{(m)}) \triangleq \|x_{DAS} - x\|_2^2 + \lambda q(x, x^{(m)}). \qquad (112)$$

Noting the general expression in (17), the remaining steps are to compute the partial derivatives of the majorizing function Q and set the results to zero. For l=1, 2, ..., L, the partial derivative of Q with respect to $x_l$ is equal to $$\frac{\partial Q}{\partial x_l} = \frac{\partial}{\partial x_l} \sum_{s=1}^{L} (x_{DAS,s} - x_s)^2 + \qquad (113)$$

$$\lambda \cdot \frac{\partial}{\partial x_l} \sum_{s=1}^{L} \left( \frac{x_s^2}{2|x_s^{(m)}|} + \frac{1}{2}|x_s^{(m)}| \right)$$

$$= -2(x_{DAS,l} - x_l) + \lambda \frac{x_l}{|x_l^{(m)}|}.$$

Setting the partial derivatives to zero leads to the proposed $l_1$-SIR algorithm $$x_l^{(m+1)} = \frac{x_{DAS,l}}{1 + \frac{\lambda}{2|x_l^{(m)}|}}. \qquad (115)$$

As in the other approaches, one may iteratively derive an estimated image value for a given voxel using the immediately above equation for $x_l^{(m+1)}$. Accordingly, a processing device may be configured to process a DAS image data set by creating an estimated image value for each voxel in the image by iteratively deriving the estimated image value through application of a majorize-minimize principle to solve an $l_1$-regularized least-squares estimation problem that selects a sparse image derived from the DAS image data set.

Results for the MM-Based $l_1$-LS Algorithm Applied to DAS Image Data Set

Figure 19:
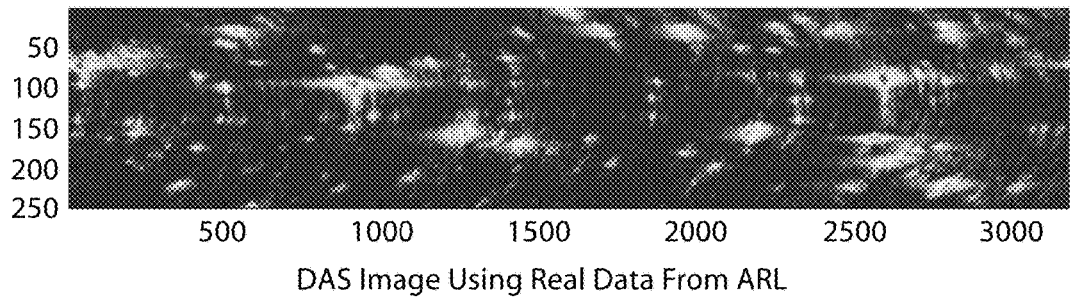
FIG. 19 comprises a displayed image of objects in a SOI using image data processed according to a prior art DAS algorithm.
Figure 20:
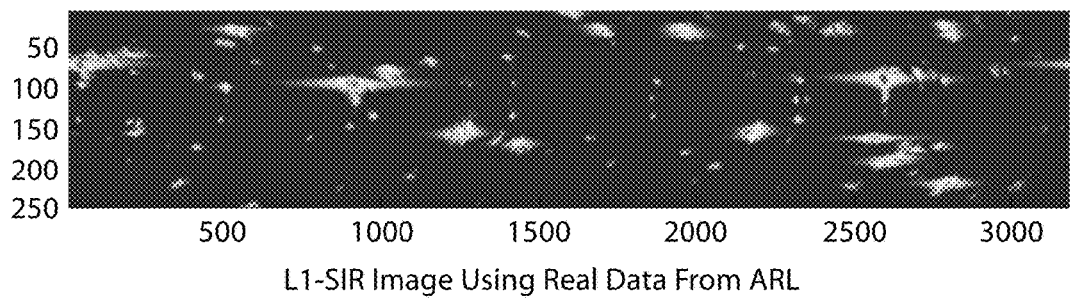
FIG. 20 comprises a displayed image of the objects in the SOI of FIG. 19, in this case using image data processed according to the L1-SIR algorithm as configured in accordance with various embodiments of the invention.
Figure 21:
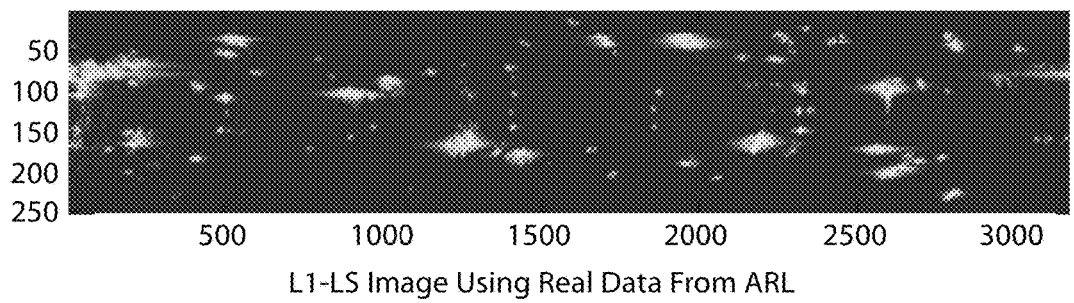
FIG. 21 comprises a displayed image of the objects in the SOI of FIG. 19, in this case using image data processed according to example algorithm applying the M-M principle to an L1-LS estimation as configured in accordance with various embodiments of the invention.

The performance of the MM-based $l_1$-LS algorithm as applied to a DAS image data set can be evaluated using a real dataset as obtained using a UWB SIRE apparatus and provided by the US Army Research Laboratory. FIGS. 19-21 show images derived using the DAS, $l_1$-SIR, and the MM based $l_1$-LS algorithms. Note, the $l_1$-LS image was reconstructed using the algorithm described in the first approach above. From a comparison of the figures, the images created using the $l_1$-SIR and $l_1$-LS algorithms images are comparable in terms of the level of sparsity and ability to resolve known targets in the SOI. However, using the MATLAB software page, the $l_1$-SIR image takes about 1.5 minutes to create while the $l_1$-LS image requires approximately 2.5 hours to reconstruct.

So configured, the $l_1$-SIR algorithm is computationally efficient and only takes approximately 5% of the time required by the DAS algorithm. In studies using real data, the $l_1$-SIR images are an improvement over the DAS images in that they have reduced clutter and improved sparsity without a loss of known scatterers. Additionally, the $l_1$-SIR images in the studies were comparable to the $l_1$-LS images. However, the $l_1$-SIR algorithm only takes 1% of the computational time of an $l_1$-LS algorithm that is also based on the MM principle. Moreover, it is contemplated that the MM principle as applied to an $l_1$-least squares estimate can be extended for application to image data sets created by other known algorithms to reduce noise in resulting images.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of creating an image from an initial data set, the method comprising:
    receiving the initial data set, the receiving comprising receiving data representing transmission site locations of radar pulses applied into ground in a ground penetrating radar application, reception site locations of reception of reflections from the radar pulses, radar-return profiles for pairings of the transmission site locations and the reception site locations, and data samples associated with individual radar-return profiles;
    processing the initial data set with a processing device by creating an estimated image value for each voxel in the image to create an estimated image value data set having most of the estimated image value data set's values at or near zero by iteratively deriving the estimated image value through application of a majorize-minimize principle to solve an $l_1$-regularized least-squares estimation problem associated with a mathematical model of image data from the initial data set;
    displaying the image using the estimated image value of individual voxels of the image.

2. The method of claim 1 further comprising iteratively deriving an estimated image value for a given voxel using for l=1,2, ... ,L $$x_l^{(m+1)} = \frac{H_l x_l^{(m)} + G_l^{(m)}}{H_l + \frac{\lambda}{2|x_l^{(m)}|}}$$

where $$H_l = \sum_{k=0}^{K-1} r_k A_{kl}^2$$

-continued $$G_l^{(m)} = \sum_{k=0}^{K-1} A_{kl}(y_k - [Ax^{[m]}]_k)$$

and where $x_1^{(m+1)}$ is the estimated image value at an $l^{th}$ voxel for iterate number (m+1), $x_l^{(m)}$ is the estimated image value at an $l^{th}$ voxel for iterate number (m), A is a K×L system matrix associated with the mathematical model of the image data, K=IJL where I is a number of transmission site locations, J is a number of reception sites for each transmit site location, L is a number of pixels in the image, $r_k$ is a number of nonzero elements in a $k^{th}$ row of the matrix A, and $y_k$ is a $k^{th}$ sample of the initial data set.

3. The method of claim 1 further comprising calculating terms used to obtain the estimated image value, wherein the calculating reduces processing time and required memory by accounting for a symmetric nature of a given radar pulse, accounting for similar discrete time delays between transmission of a given radar pulse and reception of reflections from the given radar pulse, and accounting for a short duration of the given radar pulse.

4. The method of claim 3 wherein the calculating terms comprises:
computing $G_l^{(m)}$ by applying a hash-table-based computation to $$q_{ij}[k] = \sum_{l \in S_k} d_{ijl}^{(m)}$$

where $d_{ijl}^{(m)} = \alpha_{ijl} x_l^{(m)}$ and $S_k = \{l=1, 2, \ldots, L: n_{ijl}=k\}$ and $\alpha_{ijl}$ represents attenuation of the given radar pulse during travel from an $i^{th}$ transmit location to an $l^{th}$ voxel and back to a $j^{th}$ receiver.

5. The method of claim 4 further comprising computing $G_l^{(m)}$ via $i=1,2,\ldots,I; j=1,2,\ldots,J; l=1,2,\ldots,L$ $$G_l^{(m)} = \sum_{i=1}^{I} \sum_{j=1}^{J} \alpha_{ijl} G_{ijl}^{(m)}$$

where $$G_{ijl}^{(m)} = \{(w*(y_{ij} - s_{ij}^{(m)}))[k]\}|_{k=n_{ijl}}$$

$$s_{ij}^{(m)}[n] = (q_{ij}*w)[n]$$

and where $y_{ij}[k]$ is a $k^{th}$ sample of a radar-return profile associated with an $i^{th}$ transmit location and $j^{th}$ receiver, $s_{ij}^{(m)}[k]$ is the $m^{th}$ estimate of a noise-free component of $y_{ij}[k]$, w is a discretized version of the given radar pulse, and $n_{ijl}$ is a discrete time-delay corresponding to rounding the quotient of the time taken by the given radar pulse to travel from a transmitter at the $i^{th}$ transmit location to the $l^{th}$ voxel and back to the $j^{th}$ receiver and a sampling interval, and * denotes discrete-time convolution.

6. The method of claim 3 wherein the calculating of the terms comprises:

computing $H_l$ by applying a hash-table-based computation to $$|S_k|$$

where $|S_k|$ denotes a number of elements in the set $S_k$.

7. The method of claim 6 wherein the computing $H_l$ further comprises computing $H_l$ via $i=1,2,\ldots,I; j=1,2,\ldots,J; l=1,2,\ldots,L$ $$H_l = \sum_{i=1}^{I} \sum_{j=1}^{J} \alpha_{ijl}^2 H_{ijl}$$

where $$H_{ijl} = (\gamma_{ij}*h)[k]|_{k=n_{ijl}},$$

$$\gamma_{ij}[n] = v(\min(n+M, N)) - v(\max(0, n-M))),$$

$$v(m) = \sum_{k=0}^{m} |S_k|$$

and where h is a discretized version of a squared radar pulse and 2M+1 is a number of non-zero samples in the given radar pulse.

8. The method of claim 1 further comprising:
emitting a radar pulse applied into the ground at specified intervals into a scene of interest;
detecting magnitude of signal reflections from the scene of interest from the radar pulse;
recording position data corresponding to individual radar pulse emissions and individual receptions of the signal reflections; and
creating the initial data set from the position data and detected magnitudes of the signal reflections.

9. A method of creating an image from an initial data set, the method comprising:
receiving the initial data set, the receiving comprising receiving data representing transmission site locations of radar pulses applied into ground in a ground penetrating radar application, reception site locations of reception of reflections from the radar pulses, radar-return profiles for pairings of the transmission site locations and the reception site locations, and data samples associated with individual radar-return profiles;
processing the initial data set with a processing device by:
creating an estimated image value for each voxel in the image to create an estimated image value data set having most of the estimated image value data set's values at or near zero by iteratively deriving the estimated image value through application of a majorize-minimize principle to solve the $l_1$-regularized least-absolute deviation estimation problem associated with a mathematical model of image data from the initial data set;
displaying the image using the estimated image value of individual voxels of the image.

10. The method of claim 9 further comprising iteratively deriving an estimated image value for a given voxel using $$\text{for } l = 1, 2, \ldots, L$$

$$x_l^{(m+1)} = \frac{D_l^{(m)} x_l^{(m)} + N_l^{(m)}}{D_l^{(m)} + \frac{\lambda}{|x_l^{(m)}|}} \text{ for } l = 1, 2, \ldots, L$$

where $$D_l^{(m)} = \sum_{k=0}^{K-1} \frac{r_k A_{kl}^2}{|y_k - [Ax^{(m)}]_k|}$$

$$N_l^{(m)} = \sum_{k=0}^{K-1} A_{kl} \cdot \text{sign}(y_k - [Ax^{(m)}]_k)$$

and where $x_l^{(m+1)}$ is the estimated image value at an $l^{th}$ voxel for iterate number (m+1), $x_l^{(m)}$ is the estimated image value at an $l^{th}$ voxel for iterate number (m), A is a K×L system matrix associated with the mathematical model of the image data, $r_k$ is a number of nonzero elements in a $k^{th}$ row of the matrix A, and $y_k$ is a $k^{th}$ sample of the initial data set.

11. The method of claim 9 further comprising calculating terms used to obtain the estimated image value,
wherein the calculating the terms reduces processing time and required memory by accounting for a symmetric nature of a given radar pulse, accounting for similar discrete time delays between transmission of a given radar pulse and reception of reflections from the given radar pulse, and accounting for a short duration of the given radar pulse.

12. The method of claim 11 wherein the calculating the terms comprises:
computing $N_l^{(m)}$ by applying a hash-table-based computation to $$q_{ij}[k] = \sum_{l \in S_k} d_{ijl}^{(m)}$$

13. The method of claim 12 wherein the computing the term $N_l^{(m)}$ further comprises computing $N_l^{(m)}$ via $$i=1,2,\ldots,I; j=1,2,\ldots,J; l=1,2,\ldots,L;$$

$$N_l^{(m)} = \sum_{i=1}^{I} \sum_{j=1}^{J} \alpha_{ijl} N_{ijl}^{(m)}$$

where $$N_{ijl}^{(m)} = \{w * (\text{sign}(y_{ij} - s_{ij}^{(m)}))[k]\}|_{k=n_{ijl}},$$

$$s_{ij}^{(m)}[n] = (q_{ij} * w)[n],$$

and $y_{ij}$ is a $k^{th}$ sample of a radar-return profile associated with an $i^{th}$ transmit location and a $j^{th}$ receiver, $s_{ij}^{(m)}[k]$ is an $m^{th}$ estimate of a noise-free component of $y_{ij}[k]$, w is a discretized version of the given radar pulse, $\alpha_{ijl}$ represents attenuation of the given radar pulse during travel from an $i^{th}$ transmit location to an $l^{th}$ voxel and back to a $j^{th}$ receiver, and $n_{ijl}$ is a discrete time-delay corresponding to rounding a quotient of time for the given radar pulse to travel from a transmitter at the $i^{th}$ transmit location to the $l^{th}$ voxel and back to the $j^{th}$ receiver and a sampling interval, and * denotes discrete-time convolution.

14. The method of claim 11 wherein the calculating the terms comprises:
computing $D_l^{(m)}$ by applying a hash-table-based computation to $|S_k|$ where $|S_k|$ denotes a number of elements in the set $S_k$.

15. The method of claim 14 wherein the computing the term $D_l^{(m)}$ further comprises computing $D_l^{(m)}$ via $$\text{for } i=1,2,\ldots,I; j=1,2,\ldots,J; l=1,2,\ldots,L$$

$$D_l^{(m)} = \sum_{i=1}^{I} \sum_{j=1}^{J} \alpha_{ijl}^2 D_{ijl}^{(m)}$$

where $$D_{ijl}^{(m)} = \left\{\left(\left(\frac{\gamma_{ij}}{|y_{ij} - s_{ij}^{(m)}|}\right) * h\right)[k]\right\}\bigg|_{k=n_{ijl}},$$

$$\gamma_{ij}[n] = v(\min(n + M, N)) - v(\max(0, n - M))),$$

$$v(m) = \sum_{k=0}^{m} |S_k|$$

and where h is a discretized version of a squared radar pulse and 2M+1 is a number of non-zero samples in the given radar pulse.

16. The method of claim 9 further comprising:
emitting a radar pulse applied into ground in a ground penetrating radar application at specified intervals into a scene of interest;
detecting magnitude of signal reflections from the scene of interest from the radar pulse; and
recording position data corresponding to individual radar pulse emissions and individual receptions of the signal reflections;
creating the initial data set from the position data and detected magnitudes of the signal reflections.

17. An apparatus for detecting objects in a scene of interest, the apparatus comprising:
a vehicle;
a plurality of radar transmission devices mounted on the vehicle and configured to transmit radar pulses into ground in a scene of interest;
a plurality of radar reception devices mounted on the vehicle configured to detect magnitude of signal reflections from the scene of interest from the radar pulses;
a location determination device configured to detect location of the vehicle at times of transmission of the radar pulse from the plurality of radar transmission devices and reception of the signal reflections by the radar reception devices;
a processing device configured to process an initial data set representing transmission site locations of individual ones of the radar pulses, reception site locations of reception of individual ones of the signal reflections, and number of data samples per reception profile by:
creating an estimated image value for each voxel in the image to create an estimated image value data set having most of the estimated image value data set's values at or near zero by iteratively deriving the estimated image value through application of a majorize-minimize principle to solve an $l_1$-regularized least-squares estimation problem associated with a mathematical model of image data from the initial data set.

18. The apparatus of claim 17 wherein the processing device is further configured to iteratively derive an estimated image value for a given voxel using for $l=1,2,\ldots,L$ $$x_l^{(m+1)} = \frac{H_l x_l^{(m)} + G_l^{(m)}}{H_l + \frac{\lambda}{|2x_l^{(m)}|}}$$

where $$H_l = \sum_{k=0}^{K-1} r_k A_{kl}^2$$

$$G_l^{(m)} = \sum_{k=0}^{K-1} A_{kl}(y_k - [Ax^{(m)}]_k)$$

where $x_l^{(m+1)}$ is the estimated image value at an $l^{th}$ voxel for iterate number (m+1), $x_l^{(m)}$ is the estimated image value at the $l^{th}$ voxel for iterate number (m), A is a K×L system matrix associated with the mathematical model of the image data, K=IJL where I is a number of transmission site locations, J is a number of reception sites, and L is a number of pixels in the image, $r_k$ is a number of nonzero elements in a $k^{th}$ row of the matrix A, and $y_k$ is a $k^{th}$ sample of the initial data set.

19. The apparatus of claim 17 wherein the processing device is further configured to calculate terms used to obtain the estimated image value,
wherein the calculating reduces processing time and required memory by accounting for a symmetric nature of a given radar pulse, accounting for similar discrete time delays between transmission of a given radar pulse and reception of reflections from the given radar pulse, and accounting for a short duration of the given radar pulse.

20. The apparatus of claim 19 wherein the processing device is further configured to calculate terms by computing $G_l^{(m)}$ by applying a hash-table-based computation to $$q_{ij}[k] = \sum_{l \in S_k} d_{ijl}^{(m)}$$

where $d_{ijl}^{(m)} = \alpha_{ijl} x_l^{(m)}$ and $S_k = \{l=1, 2, \ldots, L: n_{ijl}=k\}$ and $\alpha_{ijl}$ represents attenuation of the given radar pulse during travel from an $i^{th}$ transmit location to an $l^{th}$ voxel and back to a $j^{th}$ receiver.

21. The apparatus of claim 20 wherein the processing device is further configured to compute $G_l^{(m)}$ via $i=1,2,\ldots,I; j=1,2,\ldots,J; l=1,2,\ldots,L$ $$G_l^{(m)} = \sum_{i=1}^{I} \sum_{j=1}^{J} \alpha_{ijl} G_{ijl}^{(m)}$$

where $$G_{ijl}^{(m)} = \{(w*(y_{ij} - s_{ij}^{(m)}))[k]\}|_{k=n_{ijl}},$$

$$s_{ij}^{(m)}[n] = (q_{ij}*w)[n],$$

and where $y_{ij}[k]$ is a $k^{th}$ sample of a radar-return profile associated with an $i^{th}$ transmit location and $j^{th}$ receiver, $s_{ij}^{(m)}[k]$ is the $m^{th}$ estimate of a noise-free component of $y_{ij}[k]$, w is a discretized version of the given radar pulse, and $n_{ijl}$ is a discrete time-delay corresponding to rounding a quotient of time for the given radar pulse to travel from a transmitter at the $i^{th}$ transmit location to the $l^{th}$ voxel and back to the $j^{th}$ receiver and a sampling interval, and * denotes discrete-time convolution.

22. The apparatus of claim 19 wherein the processing device is further configured to calculate terms by computing $H_l$ by applying a hash-table-based computation to $|S_k|$ where $|S_k|$ denotes a number of elements in the set $S_k$.

23. The apparatus of claim 22 wherein the processing device is further configured to compute $H_l$ by computing $H_l$ via $i=1,2,\ldots,I; j=1,2,\ldots,J; l=1,2,\ldots,L$ $$H_l = \sum_{i=1}^{I} \sum_{j=1}^{J} \alpha_{ijl}^2 H_{ijl}$$

where $$H_{ijl} = \{(\gamma_{ij}*h)[k]\}|_{k=n_{ijl}},$$

$$\gamma_{ij}[n] = v(\min(n+M, N)) - v(\max(0, n-M))),$$

$$v(m) = \sum_{k=0}^{m} |S_k|$$

where h is a discretized version of a squared radar pulse and 2M+1 is a number of non-zero samples in the given radar pulse.

24. An apparatus for detecting objects in a scene of interest, the apparatus comprising:
a vehicle;
a plurality of radar transmission devices mounted on the vehicle and configured to transmit radar pulses into ground in a scene of interest;
a plurality of radar reception devices mounted on the vehicle configured to detect magnitude of signal reflections from the scene of interest from the radar pulses;
a location determination device configured to detect location of the vehicle at times of transmission of the radar pulse from the plurality of radar transmission devices and reception of the signal reflections by the radar reception devices;
a processing device configured to process an initial data set representing transmission site locations of individual ones of the radar pulses, reception site locations of reception of individual ones of the signal reflections, and number of data samples per reception profile by:
creating an estimated image value for each voxel in the image to create an estimated image value data set having most of the estimated image value data set's values at or near zero by iteratively deriving the estimated image value through application of a majorize-minimize principle to solve the $l_1$-regularized least-absolute deviation estimation problem associated with a mathematical model of image data from the initial data set.

25. The apparatus of claim 24 wherein the processing device is further configured to iteratively derive an estimated image value for a given voxel using for $l=1,2,\ldots,L$ $$x_l^{(m+1)} = \frac{D_l^{(m)} x_l^{(m)} + N_l^{(m)}}{D_l^{(m)} + \frac{\lambda}{|x_l^{(m)}|}} \text{ for } l = 1, 2, \ldots, L$$

where $$D_l^{(m)} = \sum_{k=0}^{K-1} \frac{r_k A_{kl}^2}{|y_k - [Ax^{(m)}]_k|}$$

$$N_l^{(m)} = \sum_{k=0}^{K-1} A_{kl} \cdot \text{sign}(y_k - [Ax^{(m)}]_k)$$

where $x_l^{(m+1)}$ is the estimated image value at an $l^{th}$ voxel for iterate number (m+1), $x_l^{(m)}$ is the estimated image value at an $l^{th}$ voxel for iterate number (m), A is a K×L system matrix associated with the mathematical model of the image data, $r_k$ is a number of nonzero elements in a $k^{th}$ row of the matrix A, and $y_k$ is a $k^{th}$ sample of the initial data set.

26. The apparatus of claim 24 wherein the processing device is further configured to calculate terms used to obtain the estimated image value,
wherein the calculating the terms reduces processing time and required memory by accounting for a symmetric nature of a given radar pulse, accounting for similar discrete time delays between transmission of a given radar pulse and reception of reflections from the given radar pulse, and accounting for a short duration of the given radar pulse.

27. The apparatus of claim 26 wherein the processing device is further configured to calculate terms by computing $N_l^{(m)}$ by applying a hash-table-based computation to $$q_{ij}[k] = \sum_{l \in S_k} d_{ijl}^{(m)}.$$

28. The apparatus of claim 27 wherein the processing device is further configured to compute $N_l^{(m)}$ via $i=1,2,\ldots,I; j=1,2,\ldots,J; l=1,2,\ldots,L;$ $$N_l^{(m)} = \sum_{i=1}^{I} \sum_{j=1}^{J} \alpha_{ijl} N_{ijl}^{(m)}$$

where $N_{ijl}^{(m)} = \{w * (\text{sign}(y_{ij} - s_{ij}^{(m)}))[k]\}|_{k=n_{ijl}}$, $s_{ij}^{(m)}[n] = (q_{ij} * w)[n]$, and $y_{ij}$ is a $k^{th}$ sample of a radar-return profile associated with an $i^{th}$ transmit location and a $j^{th}$ receiver, $s_{ij}^{(m)}[k]$ is an $m^{th}$ estimate of a noise-free component of $y_{ij}[k]$, w is a discretized version of the given radar pulse, $\alpha_{ijl}$ represents attenuation of the given radar pulse during travel from an $i^{th}$ transmit location to an $l^{th}$ voxel and back to a $j^{th}$ receiver, and $n_{ijl}$ is a discrete time-delay corresponding to rounding a quotient of time for the given radar pulse to travel from a transmitter at the $i^{th}$ transmit location to the $l^{th}$ voxel and back to the $j^{th}$ receiver and a sampling interval, and * denotes discrete-time convolution.

29. The apparatus of claim 26 wherein the processing device is further configured to calculate terms by computing $D_l^{(m)}$ by applying a hash-table-based computation to $|S_k|$ where $|S_k|$ denotes a number of elements in the set $S_k$.

30. The apparatus of claim 29 wherein the processing device is further configured to calculate terms by computing $D_l^{(m)}$ via for $i=1,2,\ldots,I; j=1,2,\ldots,J; l=1,2,\ldots,L$ $$D_l^{(m)} = \sum_{i=1}^{I} \sum_{j=1}^{J} \alpha_{ijl}^2 D_{ijl}^{(m)}$$

where $$D_{ijl}^{(m)} = \left\{\left(\left(\frac{\gamma_{ij}}{|y_{ij} - s_{ij}^{(m)}|}\right) * h\right)[k]\right\}\Bigg|_{k=n_{ijl}},$$

$\gamma_{ij}[n] = v(\min(n + M, N)) - v(\max(0, n - M)))$, $$v(m) = \sum_{k=0}^{m} |S_k|$$

where h is a discretized version of a squared radar pulse and 2M+1 is a number of non-zero samples in the given radar pulse.

31. A method of creating an image from a data set, the method comprising:
receiving a DAS image data set created by applying a delay-and-sum (DAS) algorithm to create an initial data set, the receiving comprising receiving data representing transmission site locations of radar pulses applied into ground in a ground penetrating radar application, reception site locations of reception of reflections from the radar pulses, radar-return profiles for pairings of the transmission site locations and the reception site locations, and data samples associated with individual radar-return profiles;
processing the DAS image data set with a processing device by creating an estimated image value for each voxel in the image to create an estimated image value data set having most of the estimated image value data set's values at or near zero by iteratively deriving the estimated image value through application of a majorize-minimize principle to solve an $l_1$-regularized least-squares estimation problem that selects a sparse image derived from the DAS image data set;
displaying the image using the estimated image value of individual voxels of the image.

32. The method of claim 31 further comprising iteratively deriving an estimated image value for a given voxel using for $l=1,2,\ldots,L$ $$x_l^{(m+1)} = \frac{x_{DAS,l}}{1 + \frac{\lambda}{2|x_l^{(m)}|}}$$

and where $x_l^{(m+1)}$ is the estimated image value at an $l^{th}$ voxel for iterate number (m+1), $x_l^{(m)}$ is the estimated image value at an $l^{th}$ voxel for iterate number (m), λ is a penalty parameter, and $X_{DAS,l}$ is a value of the $l^{th}$ voxel of the DAS image data set.

33. The method of claim 31 further comprising:
emitting a radar pulse applied into the ground at specified intervals into a scene of interest;
detecting magnitude of signal reflections from the scene of interest from the radar pulse;
recording position data corresponding to individual radar pulse emissions and individual receptions of the signal reflections;
creating the initial data set from the position data and detected magnitudes of the signal reflections; and
applying the delay-and-sum (DAS) algorithm to the initial data set to create the DAS image data set.

34. An apparatus for detecting objects in a scene of interest, the apparatus comprising:
a vehicle;
a plurality of radar transmission devices mounted on the vehicle and configured to transmit radar pulses into ground in a scene of interest;
a plurality of radar reception devices mounted on the vehicle configured to detect magnitude of signal reflections from the scene of interest from the radar pulses;
a location determination device configured to detect location of the vehicle at times of transmission of the radar pulse from the plurality of radar transmission devices and reception of the signal reflections by the radar reception devices;
a processing device configured to process an initial data set representing transmission site locations of individual ones of the radar pulses, reception site locations of reception of individual ones of the signal reflections, and number of data samples per reception profile by:
applying a delay-and-sum (DAS) algorithm to the initial data set to create a DAS image data set,
creating an estimated image value for each voxel in the image to create an estimated image value data set having most of the estimated image value data set's values at or near zero by iteratively deriving the estimated image value through application of a majorize-minimize principle to solve an $l_1$-regularized least-squares estimation problem that selects a sparse image derived from the DAS image data set.

35. The apparatus of claim 34 wherein the processing device is further configured to iteratively derive an estimated image value for a given voxel using for $l=1,2,\ldots,L$ $$x_l^{(m+1)} = \frac{x_{DAS,l}}{1 + \frac{\lambda}{2|x_l^{(m)}|}}$$

and where $x_l^{(m+1)}$ is the estimated image value at an $l^{th}$ voxel for iterate number (m+1), $x_l^{(m)}$ is the estimated image value at an $l^{th}$ voxel for iterate number (m), λ is a penalty parameter, and $X_{DAS,l}$ is a value of the $l^{th}$ voxel of the DAS image data set.

* * * * *